United States Patent
Matsui et al.

(10) Patent No.: US 11,764,408 B2
(45) Date of Patent: Sep. 19, 2023

(54) BATTERY, BATTERY PACK, ELECTRONIC DEVICE, ELECTRIC VEHICLE, POWER STORAGE DEVICE, AND POWER SYSTEM

(71) Applicant: MURATA MANUFACTURING CO., LTD., Kyoto (JP)

(72) Inventors: Takaaki Matsui, Kyoto (JP); Takashi Kokubun, Kyoto (JP); Taichi Kogure, Kyoto (JP); Kazuki Honda, Kyoto (JP); Masumi Fukuda, Kyoto (JP); Naoko Yamakawa, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 130 days.

(21) Appl. No.: 16/703,413

(22) Filed: Dec. 4, 2019

(65) Prior Publication Data

US 2020/0112064 A1 Apr. 9, 2020

Related U.S. Application Data

(63) Continuation of application No. PCT/JP2018/030429, filed on Aug. 16, 2018.

(30) Foreign Application Priority Data

Aug. 29, 2017 (JP) ................. 2017-164372

(51) Int. Cl.
*H01M 10/0587* (2010.01)
*H01M 10/0525* (2010.01)
(Continued)

(52) U.S. Cl.
CPC ... *H01M 10/0587* (2013.01); *H01M 10/0525* (2013.01); *H01M 50/105* (2021.01);
(Continued)

(58) Field of Classification Search
CPC ..... Y02P 70/50; H01M 50/10; H01M 50/124; H01M 50/105; H01M 10/0587; H01M 10/0525; H01M 10/0431; Y02E 60/10
(Continued)

(56) References Cited

U.S. PATENT DOCUMENTS

2003/0180605 A1 9/2003 Mizutani
2006/0127751 A1 6/2006 Woo
(Continued)

FOREIGN PATENT DOCUMENTS

| JP | 2001015146 A | 1/2001 |
| JP | 2003051339 A | 2/2003 |

(Continued)

OTHER PUBLICATIONS

English language machine translation of Nakamoto Takeshi JP 2007172880 Battery and its Manufacturing Method (Year: 2007).*
(Continued)

*Primary Examiner* — Jonathan G Jelsma
*Assistant Examiner* — Omar M Kekia
(74) *Attorney, Agent, or Firm* — K&L Gates LLP

(57) ABSTRACT

A battery includes a positive electrode having a first strip shape and a positive electrode lead, and a negative electrode having a second strip shape and a negative electrode lead. First ends of the positive electrode and the negative electrode in a longitudinal direction are on an inner peripheral side, and second ends of the positive electrode and the negative electrode in the longitudinal direction are on an outer peripheral side. The positive electrode lead and the negative electrode lead are extended out from a first end side in a width direction of the positive electrode and the negative electrode, and a first thickness of the positive electrode on
(Continued)

the first end side is thinner than a second thickness of the positive electrode on a second end side in the width direction.

18 Claims, 12 Drawing Sheets

(51) Int. Cl.
 *H01M 50/105* (2021.01)
 *H01M 50/124* (2021.01)
 *H01M 10/04* (2006.01)
 *H01M 50/10* (2021.01)

(52) U.S. Cl.
 CPC ........ *H01M 10/0431* (2013.01); *H01M 50/10* (2021.01); *H01M 50/124* (2021.01); *Y02E 60/10* (2013.01); *Y02P 70/50* (2015.11)

(58) Field of Classification Search
 USPC .......................................................... 429/94
 See application file for complete search history.

(56) References Cited

U.S. PATENT DOCUMENTS

| | | | |
|---|---|---|---|
| 2015/0129332 A1* | 5/2015 | Seto ................... | H01M 10/0481 |
| | | | 180/65.1 |
| 2015/0244017 A1* | 8/2015 | Nishinaka ........... | H01M 4/0404 |
| | | | 429/233 |
| 2018/0062147 A1* | 3/2018 | Onoda ................. | H01M 50/20 |

FOREIGN PATENT DOCUMENTS

| | | |
|---|---|---|
| JP | 2006156365 A | 6/2006 |
| JP | 2007172880 A | 7/2007 |
| JP | 2016-225039 | 12/2016 |

OTHER PUBLICATIONS

International Search Report for Application No. PCT/JP2018/030429, dated Oct. 9, 2018.
Chinese Office Action dated Aug. 1, 2088 in corresponding Chinese Application No. 201880047022.X.
Chinese Office Action dated Apr. 23, 2023 in corresponding Chinese Application No. 201880047022.X.

\* cited by examiner

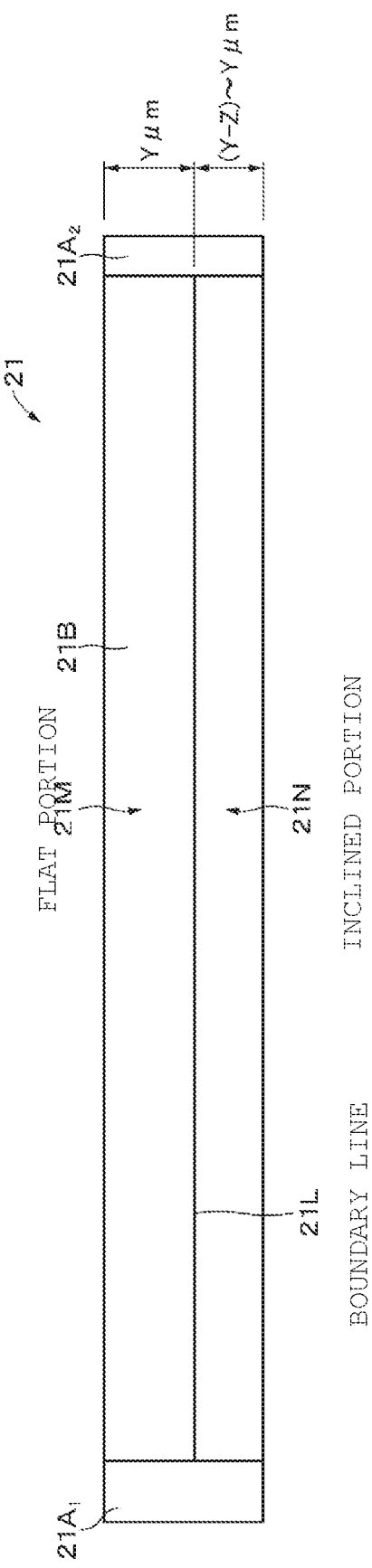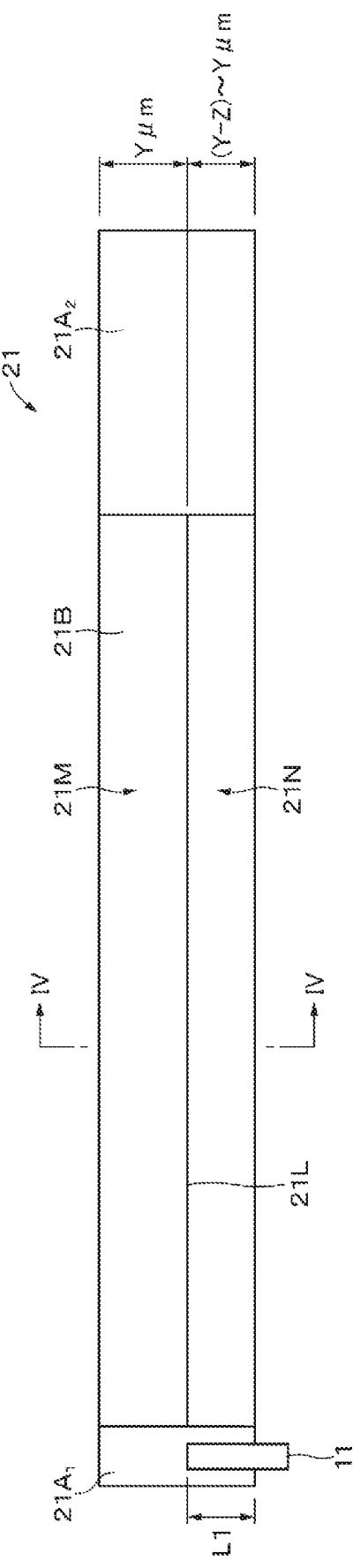

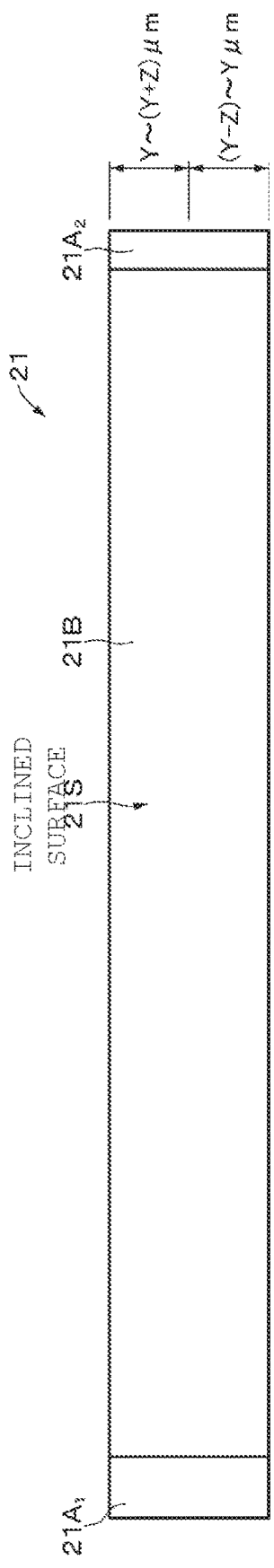
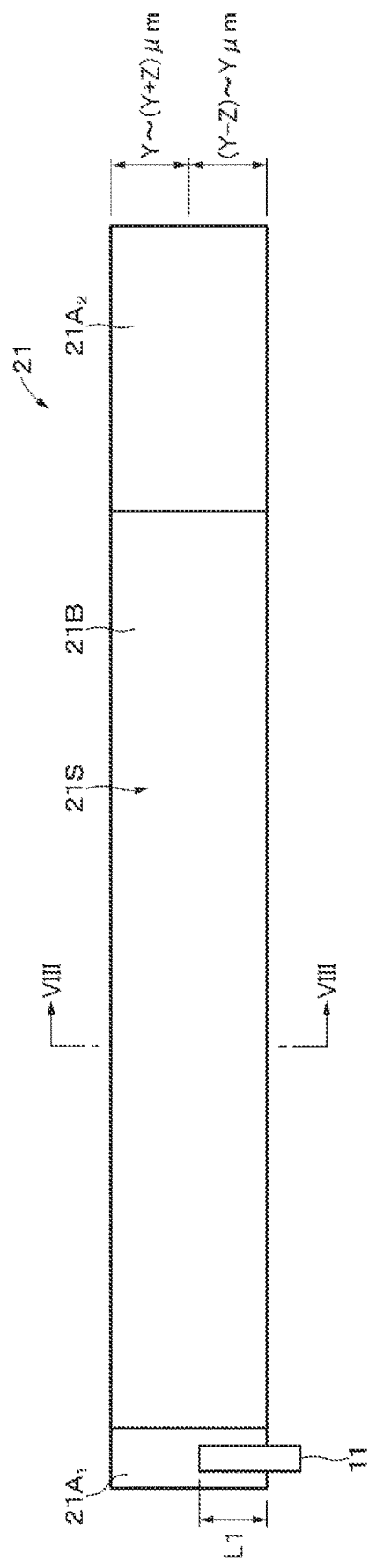
FIG. 7A
FIG. 7B

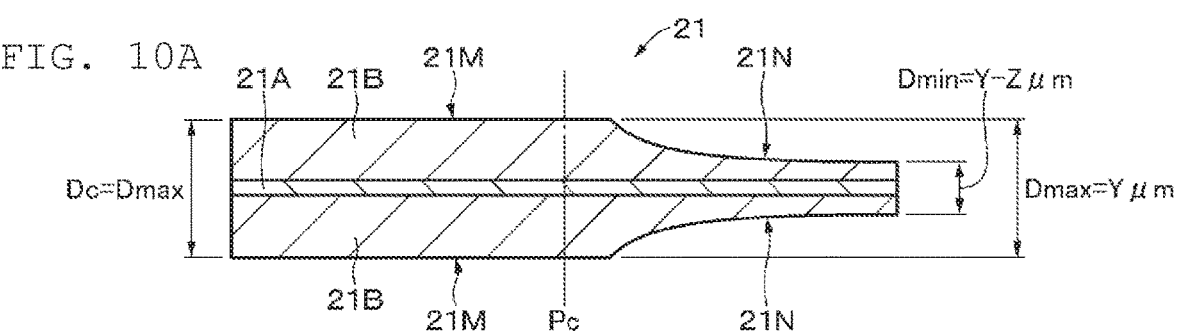
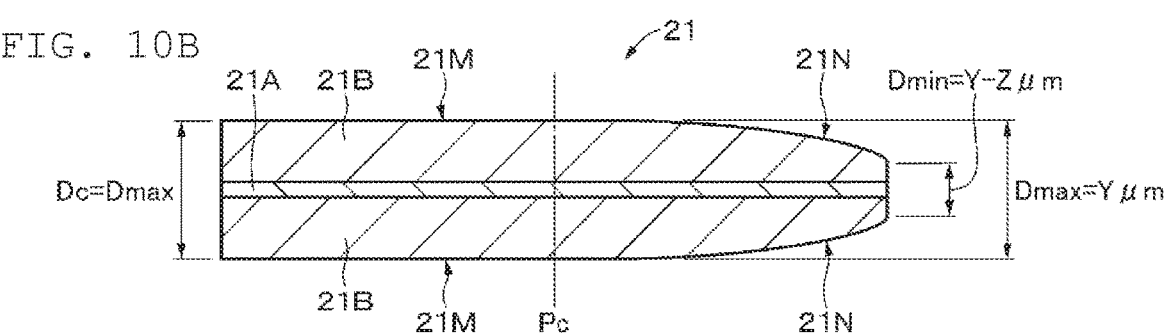
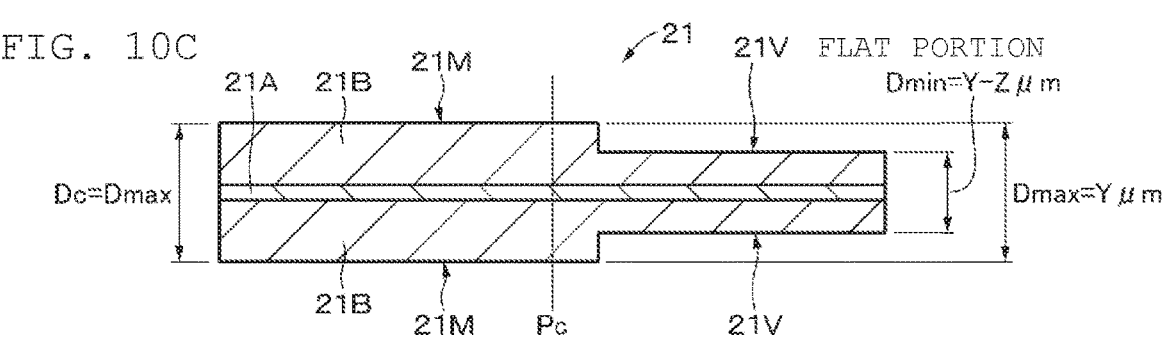
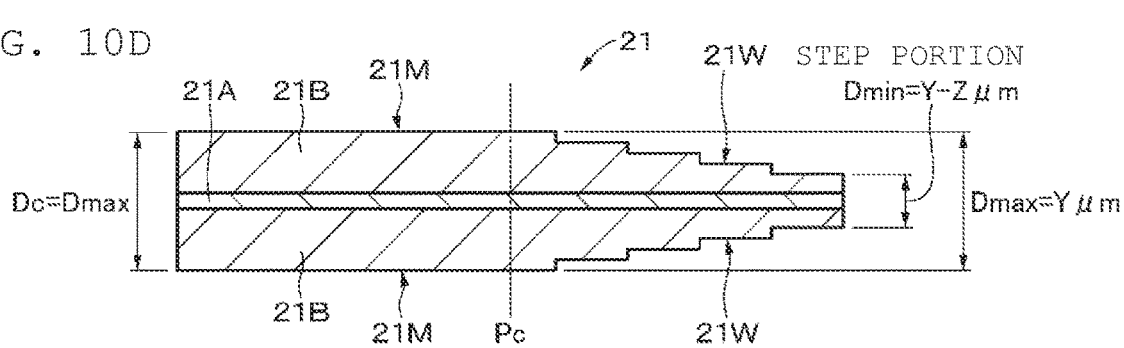
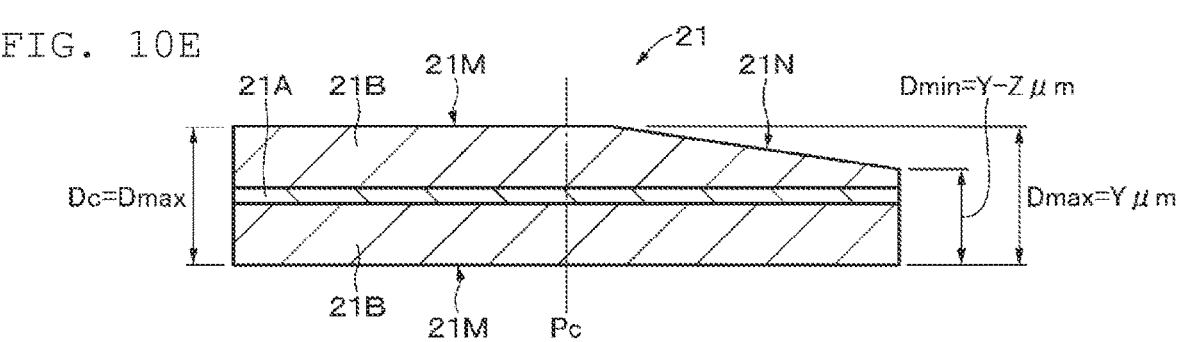

BATTERY, BATTERY PACK, ELECTRONIC DEVICE, ELECTRIC VEHICLE, POWER STORAGE DEVICE, AND POWER SYSTEM

CROSS REFERENCE TO RELATED APPLICATIONS

The present application is a continuation of PCT patent application no. PCT/JP2018/030429, filed on Aug. 16, 2018, which claims priority to Japanese patent application no. JP2017-164372 filed on Aug. 29, 2017, the entire contents of which are being incorporated herein by reference.

BACKGROUND

The present disclosure generally relates to a battery, a battery pack, an electronic device, an electric vehicle, a power storage device, and a power system.

In recent years, various electronic devices such as mobile phones and personal digital assistants (PDAs) have become widespread, and further downsizing, weight reduction, and long life of such electronic devices are desired. Accordingly, as a power source, development of a battery, in particular, a secondary battery that is small and lightweight and capable of obtaining high energy density is in progress.

As a configuration of the battery, a wound type is widely used. In a wound-type battery, a positive electrode lead and a negative electrode lead are generally provided on a positive electrode and a negative electrode, respectively.

SUMMARY

The present disclosure generally relates to a battery, a battery pack, an electronic device, an electric vehicle, a power storage device, and a power system.

In a wound-type battery in which a positive electrode lead and a negative electrode lead are provided on the positive electrode and the negative electrode, respectively, cycle characteristics may be deteriorated.

An object of the present disclosure is to provide a battery, a battery pack, an electronic device, an electric vehicle, a power storage device, and a power system that can suppress a decrease in cycle characteristics.

According to an embodiment of the present disclosure, a battery is provided. The battery includes a positive electrode having a first strip shape and a positive electrode lead, and a negative electrode having a second strip shape and a negative electrode lead. The positive electrode and the negative electrode are wound in a flat shape so that first ends in a longitudinal direction of the positive electrode and the negative electrode are on an inner peripheral side, and second ends in the longitudinal direction of the positive electrode and the negative electrode are on an outer peripheral side, the positive electrode lead and the negative electrode lead are extended out from a first end side in a width direction of the positive electrode and the negative electrode, and a first thickness of the positive electrode on the first end side in the width direction is thinner than a second thickness of the positive electrode on a second end side in the width direction.

According to an embodiment of the present disclosure, a battery pack is provided. The battery pack includes the battery according to an embodiment as described herein and a controller configured to control the battery.

According to an embodiment as described herein an electronic device is provided. The electronic device includes the battery according to an embodiment as described herein and is configured to receive supply of power from the battery.

According to an embodiment as described herein, an electric vehicle is provided. The electric vehicle includes the battery according to an embodiment as described herein, a converter configured to receive supply of power from the battery and convert the power into a driving force of the vehicle, and a controller configured to perform information processing on vehicle control based on information on the battery.

According to an embodiment as described herein, a power storage device is provided. The power storage device includes the battery according to an embodiment as described herein, and the power storage device is configured to supply power to an electronic device connected to the battery.

According to an embodiment as described herein, a power system is provided. The power system includes the battery according to an embodiment as described herein, and the power system is configured to receive supply of power from the battery.

According to the present disclosure, it is possible to suppress a decrease in cycle characteristics. It should be understood that the effects described here are not necessarily limited, and may be any of the effects described in the present disclosure or effects different from the effects.

BRIEF DESCRIPTION OF FIGURES

FIG. 3A is a plan view illustrating an example of a configuration on an inner surface side of a positive electrode. FIG. 3B is a plan view illustrating an example of a configuration on an outer surface side of the positive electrode.

FIG. 7A is a plan view illustrating an example of a configuration of an inner surface side of a positive electrode according to an embodiment of the present disclosure. FIG. 7B is a plan view illustrating an example of a configuration on an outer surface side of the positive electrode according to an embodiment of the present disclosure.

FIGS. 10A to 10E are cross-sectional views illustrating an examples of the positive electrode according to an embodiment of the present disclosure.

DETAILED DESCRIPTION

As described herein, the present disclosure will be described based on examples with reference to the drawings, but the present disclosure is not to be considered limited to the examples, and various numerical values and materials in the examples are considered by way of example.

In a wound-type battery, each of a positive electrode lead and a negative electrode lead has an independent thickness, and a battery thickness in a portion on the positive electrode lead or the negative electrode lead is generally the largest. Accordingly, in a pressing process during initial charging or the like, a pressure applied to portions on the positive electrode lead and the negative electrode lead is large as compared to pressures applied to other than the portions on the positive electrode lead and the negative electrode lead. Therefore, compressibility of a separator is increased at portions on the positive electrode lead and the negative electrode lead, and local cycle deterioration is likely to occur. In addition, as described above, since the battery thickness is the thickest on the positive electrode lead or the negative electrode lead, the battery thickness is mostly determined by the thickness on the positive electrode lead or the negative electrode lead. For this reason, in the wound-type battery in which the positive electrode and negative electrode leads are connected to the positive electrode and the negative electrode, respectively, there is a possibility that volume energy density of the battery decreases.

Accordingly, as a result of intensive studies to solve the above-described problems, the present inventors have devised a battery in which, out of both end portions in a width direction of a positive electrode having a strip shape, a thickness of the positive electrode on a first end side where a positive electrode lead and a negative electrode lead are extended out is thinner than a thickness of the positive electrode on a second end side.

First, an example of a configuration of a non-aqueous electrolyte secondary battery (hereinafter simply referred to as "battery") according to an embodiment of the present disclosure will be described.

Figure 1:
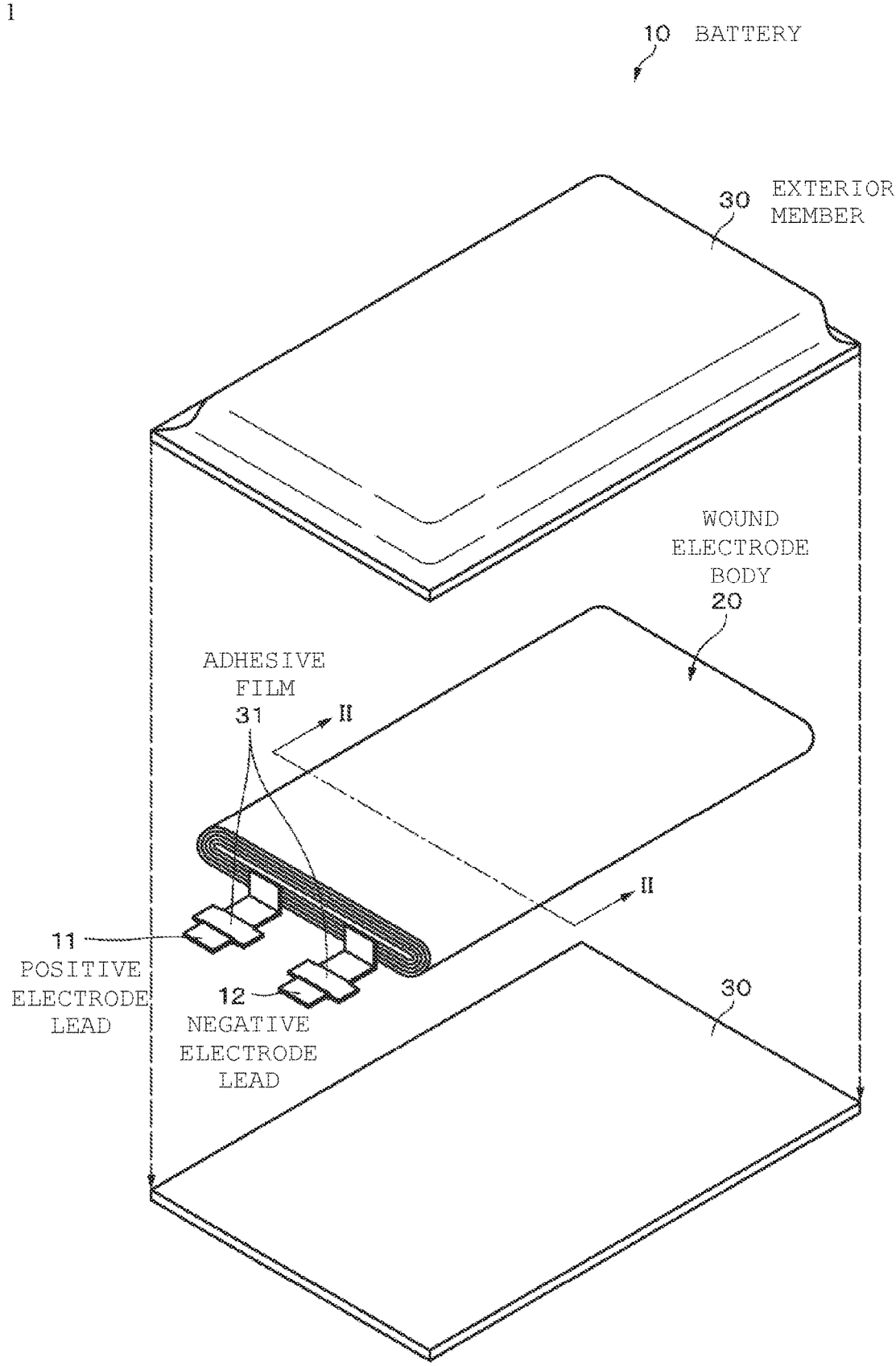
FIG. 1 is an exploded perspective view illustrating an example of a configuration of a non-aqueous electrolyte secondary battery according to an embodiment of the present disclosure.

As illustrated in FIG. 1, the battery 10 is what is called a laminated film type battery, and includes a wound electrode body 20 having a flat shape to which a positive electrode lead and a negative electrode lead 11, 12 are attached, an electrolytic solution (not illustrated), and film-shaped exterior members 30 that accommodate the wound electrode body 20 and the electrolytic solution therein. When the battery 10 is viewed in plan from a direction perpendicular to a main surface, the battery 10 has a rectangular shape.

An exterior member 30 is made of, for example, a laminated film having flexibility. The exterior member 30 has, for example, a configuration in which a heat-sealing resin layer, a metal layer, and a surface protective layer are sequentially laminated. Note that a surface on a heat-sealing resin layer side is a surface on a side where the wound electrode body 20 is accommodated. Examples of the material for the heat-sealing resin layer include polypropylene (PP) and polyethylene (PE). An example of the material for the metal layer is aluminum. An example of the material for the surface protective layer is nylon (Ny). Specifically, for example, the exterior member 30 is formed of a rectangular aluminum laminated film in which a nylon film, an aluminum foil, and a polyethylene film are bonded together in this order. For example, the exterior member 30 is disposed so that the heat-sealing resin layer side and the wound electrode body 20 oppose each other, and outer edge portions are adhered in close contact with each other by heat-sealing or an adhesive. An adhesive film 31 for preventing entrance of outside air is inserted between the exterior member 30 and the positive electrode and negative electrode leads 11, 12. The adhesive film 31 is formed of a material having a close contact property to the positive electrode and negative electrode leads 11, 12, for example, a polyolefin resin such as polyethylene, polypropylene, modified polyethylene, or modified polypropylene.

It should be understood that the exterior member 30 may be formed of a laminated film having another structure, a polymer film such as polypropylene, or a metal film instead of the above-described laminated film. Alternatively, a laminated film in which an aluminum film is used as a core and a polymer film is laminated on one or both sides thereof may be used.

Further, as the exterior member 30, in view of beauty of appearance, one further including a colored layer and/or one including a colorant in at least one layer selected from a heat-sealing resin layer or a surface protective layer may be used. When an adhesive layer is provided at least between the heat-sealing resin layer and the metal layer or between the surface protective layer and the metal layer, the adhesive layer may include a colorant.

Figure 2:
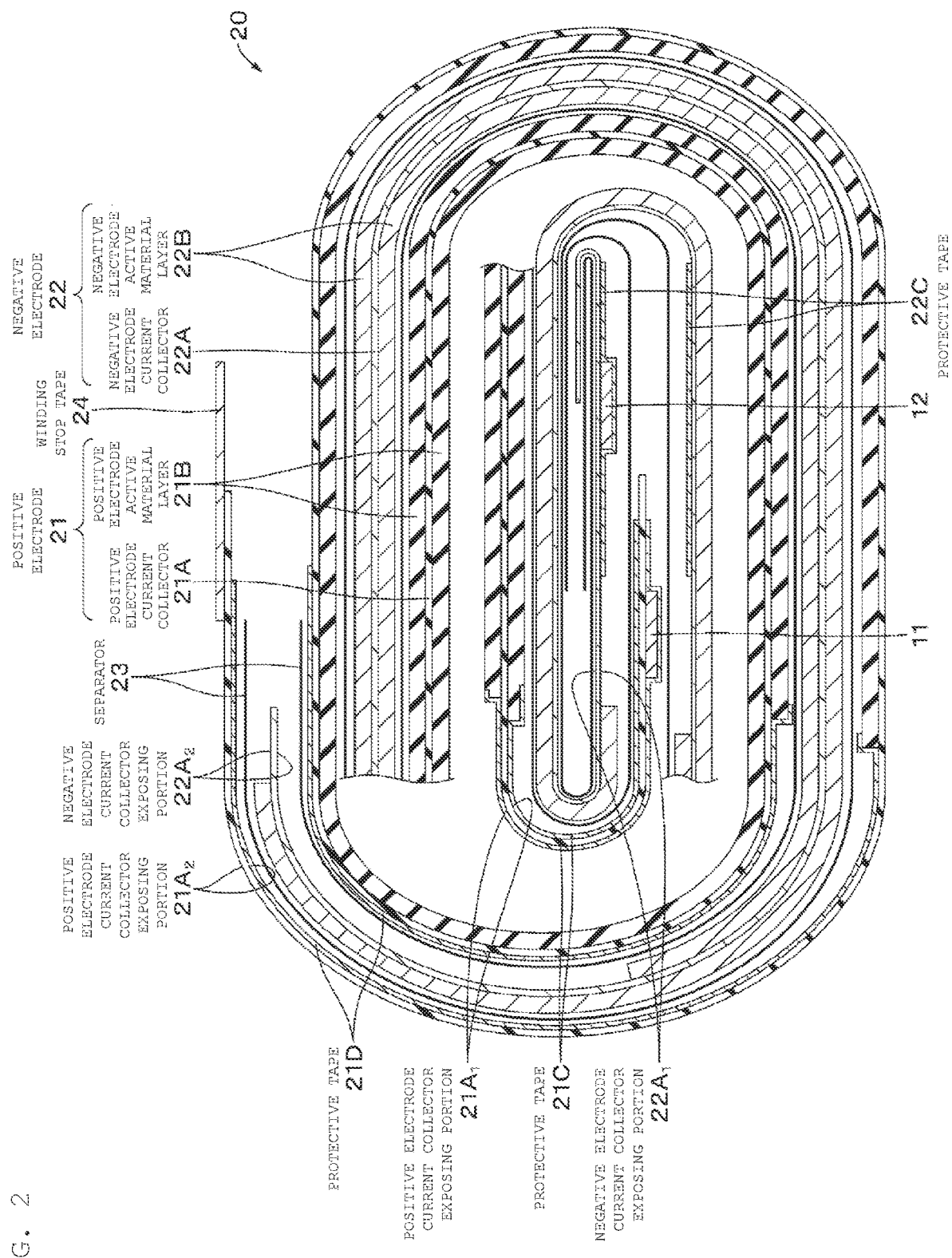
FIG. 2 is a cross-sectional view taken along a line II-II in FIG. 1.

As illustrated in FIG. 2, the wound electrode body 20 as a battery element includes a positive electrode 21 having a strip shape and having a positive electrode lead 11, a negative electrode 22 having a strip shape and having a negative electrode lead 12, and a separator 23 having a strip shape and provided between the positive electrode 21 and the negative electrode 22. The positive electrode 21, the negative electrode 22, and the separator 23 are wound in a flat shape and a spiral shape so that first ends in a longitudinal direction of the positive electrode 21, the negative electrode 22, and the separator 23 are on an inner peripheral side, and second ends in the longitudinal direction thereof are on an outer peripheral side. The positive electrode 21, the negative electrode 22, and the separator 23 are impregnated with an electrolytic solution as an electrolyte. The winding is such that the negative electrode 22 is an innermost peripheral electrode and the positive electrode 21 is an outermost peripheral electrode, and an outermost peripheral end portion of the positive electrode 21 is fixed by a winding stop tape 24. However, the winding may be such that the positive electrode 21 is the innermost peripheral electrode and the negative electrode 22 is the outermost peripheral electrode.

The positive electrode and negative electrode leads 11, 12 have a long shape. The positive electrode and negative electrode leads 11, 12 are extended out from a first end side in a width direction of the positive electrode 21 and the negative electrode 22. Each of the positive electrode and negative electrode leads 11, 12 extends from an inside of the exterior member 30 to an outside, for example, in the same direction. The positive electrode and negative electrode leads 11, 12 are formed of a metal material such as aluminum (Al), copper (Cu), nickel (Ni), or stainless steel, respectively, and have a thin plate shape or a mesh shape, respectively. Hereinafter, a short side of the battery 10 from which the positive electrode and negative electrode leads 11, 12 are led out is referred to as a top side, and a short side opposite thereto is referred to as a bottom side. In addition, a long side of the battery 10 is referred to as a lateral side.

Hereinafter, the positive electrode 21, the negative electrode 22, the separator 23, and the electrolytic solution constituting the wound electrode body 20 will be sequentially described.

As illustrated in FIG. 2, the positive electrode 21 includes a positive electrode current collector 21A and positive electrode active material layers 21B provided on both surfaces of the positive electrode current collector 21A. On a first end side (inner peripheral side) in the longitudinal direction of the positive electrode 21, a positive electrode current collector exposing portion $21A_1$ is provided in which both surfaces of the positive electrode current collector 21A are exposed without being covered with the positive electrode active material layers 21B. Further, on a second end side (outer peripheral side) in the longitudinal direction of the positive electrode 21, a positive electrode current collector exposing portion $21A_2$ is provided in which both surfaces of the positive electrode current collector 21A are exposed without being covered with the positive electrode active material layers 21B.

The positive electrode lead 11 is connected to an exposing portion on an outer surface of the positive electrode 21 in the positive electrode current collector exposing portion $21A_1$ so that a first end side in a longitudinal direction of the positive electrode lead 11 is extended out from a first end side in a width direction of the positive electrode current collector exposing portion $21A_1$. However, the positive electrode lead 11 may be connected to an exposing portion on an inner surface of the positive electrode 21 in the positive electrode current collector exposing portion $21A_1$. Here, "inside" and "outside" mean inside and outside of the positive electrode 21 in a wound state.

First ends of the positive electrode current collector exposing portion $21A_1$ and the positive electrode active material layers 21B are covered with a protective tape 21C. Note that the positive electrode lead 11 is also covered with the protective tape 21C together with the positive electrode current collector exposing portion $21A_1$. Second ends of the positive electrode current collector exposing portion $21A_2$ and the positive electrode active material layers 21B are covered with a protective tape 21D.

Figure 4:
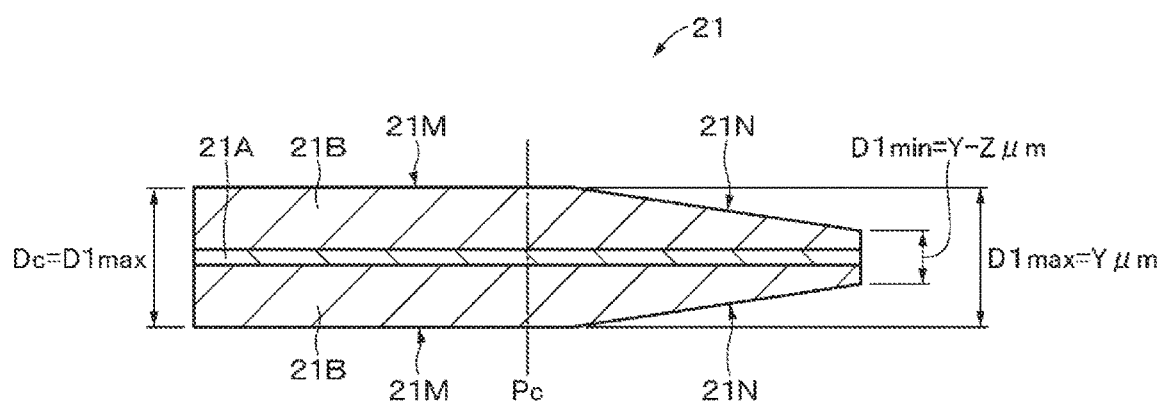
FIG. 4 is a cross-sectional view taken along a line IV-IV in FIG. 3B.

As illustrated in FIGS. 3A, 3B, and 4, a thickness of the positive electrode 21 on the first end side in the width direction of the positive electrode 21 is thinner than a thickness of the positive electrode 21 on a second end side in the width direction of the positive electrode 21. A thickness of the positive electrode active material layer 21B on the first end side in the width direction of the positive electrode 21 is thinner than a thickness of the positive electrode active material layer 21B on the second end side in the width direction of the positive electrode 21. More specifically, the positive electrode active material layer 21B has a flat portion 21M that is provided on the second end side in the width direction of the positive electrode 21 and is parallel to the surface of the positive electrode current collector 21A, and an inclined portion 21N that is provided on the first end side in the width direction of the positive electrode 21 and is thinner than the flat portion 21M. The inclined portion 21N is an example of a thin portion, and has an inclined surface that is inclined so that the thickness of the positive electrode active material layer 21B decreases in a direction from the second end to the first end of the positive electrode 21. The inclined surface is, for example, a flat surface. The inclined portion 21N is provided from a first end toward a second end in a longitudinal direction of the positive electrode active material layer 21B.

For example, when a thickness of the positive electrode 21 in the flat portion 21M is Y μm, a thickness of the positive electrode 21 in the inclined portion 21N changes in the range of (Y−Z) to Y μm with respect to the width direction of the positive electrode 21. In this case, a maximum thickness $D1_{max}$ of the positive electrode 21 in the inclined portion 21N is Y μm, and a minimum thickness $D1_{min}$ of the positive electrode 21 in the inclined portion 21N is (Y−Z) μm.

The inclined portion 21N is provided from a position between both ends in the width direction of the positive electrode 21 toward the first end. The flat portion 21M is provided from the position between the both ends in the width direction of the positive electrode 21 toward the second end. A boundary line 21L between the flat portion 21M and the inclined portion 21N is, for example, a straight line. However, the boundary line between the flat portion 21M and the inclined portion 21N is not limited to a straight line but may be a curved line or a broken line. Further, a width of the inclined portion 21N in the width direction of the positive electrode 21 may be the same or different on the both surfaces of the positive electrode 21. Further, an inclination angle of the inclined portion 21N may be the same or different on the both surfaces of the positive electrode 21.

The positive electrode lead 11 is connected to the positive electrode current collector exposing portion $21A_1$, and preferably, an inclined portion 21N is wound around a connecting portion of the positive electrode lead 11. When the positive electrode lead 11 is connected to the positive electrode current collector exposing portion $21A_1$ so as to be orthogonal to a long side on the first end side in the width direction of the positive electrode 21, a length L1 of the connecting portion of the positive electrode lead 11 is preferably shorter than the width of the inclined portion 21N in the width direction of the positive electrode 21. Thus, it is possible to further suppress an increase in a thickness of the battery 10 in a portion on the positive electrode lead 11. Therefore, it is possible to further suppress a decrease in cycle characteristics and volume energy density due to a local increase in thickness on the positive electrode lead 11.

The positive electrode 21 preferably satisfies the following relational expression (1).

$$0.13 < X1 < 1 \tag{1}$$

(Here, $X1=(((D1_{min} \times N)+d)−(D1_{max} \times N))/d$, $D1_{min}$ is a minimum thickness of the positive electrode 21 in the inclined portion (thin portion) 21N, $D1_{max}$ is a maximum thickness of the positive electrode 21 in the inclined portion (thin portion) 21N, N is the number of windings of the positive electrode 21, and d is a thickness of the positive electrode lead 11)

When the positive electrode 21 satisfies the above relational expression (1), it is possible to further suppress a decrease in cycle characteristics and volume energy density due to a local increase in thickness on the positive electrode lead 11.

Further, the positive electrode 21 preferably satisfies the following relational expression (3).

$$0.13 < X3 < 1 \tag{3}$$

(Here, $X3=(((D1_{min} \times N)+d')-(D1_{max} \times N))/d'$, $D1_{min}$ is a minimum thickness of the positive electrode 21 in the inclined portion (thin portion) 21N, $D1_{max}$ is a maximum thickness of the positive electrode 21 in the inclined portion (thin portion) 21N, N is the number of windings of the positive electrode 21, and d' is a thickness of the negative electrode lead 12)

When the positive electrode 21 satisfies the above relational expression (3), it is possible to further suppress a decrease in cycle characteristics and volume energy density due to a local increase in thickness on the negative electrode lead 12.

The thicknesses $D1_{min}$ and $D1_{max}$ are measured as follows. First, the battery 10 is prepared. The battery 10 may be, for example, a battery 10 that has not been charged or discharged once after production, or may be a battery 10 that has been charged or discharged for 1 to 10 cycles after production. The latter battery 10 is, for example, an unused battery after being commercially available. The usage history (presence or absence of charge or discharge) of the battery 10 has little influence on measurement and analysis described later.

Next, the prepared battery 10 is charged and discharged to obtain a battery 10 in a discharged state. When charging, the battery is charged until the voltage reaches 4.3 V at a current of 0.1 C, and then charged until the current reaches 100 mA at a voltage of 4.3 V. When discharging, the battery is discharged at a current of 0.1 C until the voltage reaches 3.0 V. Here, "0.1 C" is a current value at which the battery capacity (theoretical capacity) can be completely charged or discharged in 10 hours.

Subsequently, after the positive electrode 21 is taken out from the battery 10 in the discharged state, the minimum thickness $D1_{min}$ of the positive electrode 21 in the inclined portion 21N and the maximum thickness $D1_{max}$ of the positive electrode 21 in the inclined portion 21N are measured using a micrometer.

It should be understood that the thickness d of the positive electrode lead 11 and the thickness d' of the negative electrode lead 12 are also measured using a micrometer.

The positive electrode current collector 21A includes, for example, a metal material such as aluminum, an aluminum alloy, nickel, or stainless steel, and preferably includes aluminum or an aluminum alloy among these metals. As the shape of the positive electrode current collector 21A, for example, a foil shape, a plate shape, a mesh shape, or the like can be used.

The positive electrode active material layer 21B includes, for example, a positive electrode active material capable of storing and releasing lithium, which is an electrode reactant, and a binder. The positive electrode active material layer 21B may further include a conductive agent as necessary.

As the positive electrode active material capable of storing and releasing lithium, for example, lithium-containing compounds such as lithium oxide, lithium phosphorus oxide, lithium sulfide, or an intercalation complex containing lithium are suitable, and two or more kinds thereof may be mixed and used. In order to increase the energy density, lithium-containing compounds containing lithium, a transition metal element, and oxygen (O) are preferable. Examples of such lithium-containing compounds include lithium composite oxides having a layered rock salt type structure represented by expression (A), lithium composite phosphates having an olivine type structure represented by expression (B), and the like. More preferably, the lithium-containing compounds include at least one selected from the group consisting of cobalt (Co), nickel, manganese (Mn), and iron (Fe) as a transition metal element. Examples of such lithium-containing compounds include lithium composite oxides having a layered rock salt type structure represented by expression (C), expression (D), or expression (E), a lithium composite oxide having a spinel type structure represented by the expression (F), or a lithium composite phosphate having an olivine structure represented by expression (G). Specifically, there are $LiNi_{0.50}Co_{0.20}Mn_{0.30}O_2$, $LiaCoO_2$ (a≈1), $LibNiO_2$ (b≈1), $Li_{c1}Ni_{c2}Co_{1-c2}O_2$ (c1≈1, 0<c2<1), $Li_dMn_2O_4$ (d≈1), or $Li_eFePO_4$ (e≈1).

(A)

(Here, in the expression (A), M1 represents at least one element selected from Group 2 to Group 15 excluding nickel and manganese. X represents at least one of Group 16 elements or Group 17 elements other than oxygen. p, q, y, and z are values within the range of 0≤p≤1.5, 0≤q≤1.0, 0≤r≤1.0, −0.10≤y≤0.20, 0≤z≤0.2.)

$Li_aM2_bPO_4$ (B)

(Here, in the expression (B), M2 represents at least one element selected from Groups 2 to 15). a, b are values within the range of 0≤a≤2.0, 0.5≤b≤2.0.)

(C)

(Here, in the expression (C), M3 represents at least one selected from the group consisting of cobalt, magnesium (Mg), aluminum, boron (B), titanium (Ti), vanadium (V), chromium (Cr), iron, copper, zinc (Zn), zirconium (Zr), molybdenum (Mo), tin (Sn), calcium (Ca), strontium (Sr), and tungsten (W). f, g, h, j, and k are values within the range of 0.8≤f≤1.2, 0<g<0.5, 0≤h≤0.5, g+h<1, −0.1≤j≤0.2, 0≤k≤0.1. Note that the composition of lithium differs depending on the state of charge and discharge, and the value off represents a value in a completely discharged state.)

$Li_mNi_{(1-n)}M4_nO_{(2-p)}F_q$ (D)

(Here, in the expression (D), M4 represents at least one selected from the group consisting of cobalt, manganese, magnesium, aluminum, boron, titanium, vanadium, chromium, iron, copper, zinc, molybdenum, tin, calcium, strontium, and tungsten. m, n, p, and q are values within the ranges of 0.8≤m≤1.2, 0.005≤n≤0.5, −0.1≤p≤0.2, and 0≤q≤0.1. Note that the composition of lithium differs depending on the state of charge and discharge, and the value of m represents a value in a completely discharged state.)

$Li_rCo_{(1-s)}M5_sO_{(2-t)}F_u$ (E)

(Here, in the expression (E), M5 represents at least one selected from the group consisting of nickel, manganese, magnesium, aluminum, boron, titanium, vanadium, chromium, iron, copper, zinc, molybdenum, tin, calcium, strontium, and tungsten. r, s, t, and u are values within the range of 0.8≤r≤1.2, 0≤s<0.5, −0.1≤t≤0.2, and 0≤u≤0.1. Note that the composition of lithium differs depending on the state of charge and discharge, and the value of r represents a value in a completely discharged state.)

$Li_vMn_{2-w}M6_wO_xF_y$ (F)

(Here, in the expression (F), M6 represents at least one selected from the group consisting of cobalt, nickel, magnesium, aluminum, boron, titanium, vanadium, chromium, iron, copper, zinc, molybdenum, tin, calcium, strontium, and tungsten. v, w, x, and y are values within the ranges of 0.9≤v≤1.1, 0≤w≤0.6, 3.7≤x≤4.1, and 0≤y≤0.1.

It should be understood that the composition of lithium differs depending on the state of charge and discharge, and the value of v represents a value in a completely discharged state.)

$$Li_zM7PO_4 \quad (G)$$

(Here, in the expression (G), M7 represents at least one selected from the group consisting of cobalt, manganese, iron, nickel, magnesium, aluminum, boron, titanium, vanadium, niobium (Nb), copper, zinc, molybdenum, calcium, strontium, tungsten, and zirconium. z is a value within the range of $0.9 \leq z \leq 1.1$. Note that the composition of lithium differs depending on the state of charge and discharge, and the value of z represents a value in a completely discharged state.)

In addition to these, positive electrode active materials capable of storing and releasing lithium include inorganic compounds not containing lithium, such as $MnO_2$, $V_2O_5$, $V_6O_{13}$, NiS, and MoS.

The positive electrode active material capable of inserting and releasing lithium may be other than the above ones. In addition, the positive electrode active materials exemplified above may be mixed in any combination of two or more.

As the binder, for example, at least one selected from resin materials such as polyvinylidene fluoride (PVdF), polytetrafluoroethylene (PTFE), polyacrylonitrile (PAN), styrene butadiene rubber (SBR), and carboxymethyl cellulose (CMC), or copolymers mainly formed of these resin materials is used.

Examples of the conductive agent include carbon materials such as graphite, carbon fiber, carbon black, ketjen black, or carbon nanotube, and one of these may be used alone, or two or more may be mixed and used. Further, in addition to the carbon materials, a metal material or a conductive polymer material may be used as long as it is a conductive material.

As illustrated in FIG. 2, the negative electrode 22 includes a negative electrode current collector 22A and negative electrode active material layers 22B provided on both surfaces of the negative electrode current collector 22A. On a first end side (inner peripheral side) in a longitudinal direction of the negative electrode 22, a negative electrode current collector exposing portion $22A_1$ is provided in which both surfaces of the negative electrode current collector 22A are exposed without being covered with the negative electrode active material layers 22B. Further, on a second end side (outer peripheral side) in the longitudinal direction of the negative electrode 22, a negative electrode current collector exposing portion $22A_2$ is provided in which both surfaces of the negative electrode current collector 22A are exposed without being covered with the negative electrode active material layers 22B.

The negative electrode lead 12 is connected to an exposing portion on an outer surface of the negative electrode 22 in the negative electrode current collector exposing portion $22A_1$ so that a first end side in a longitudinal direction of the negative electrode lead 12 is extended out from a first end side in a width direction of the negative electrode current collector exposing portion $22A_1$. However, the negative electrode lead 12 may be connected to an exposing portion on an inner surface of the negative electrode 22 in the negative electrode current collector exposing portion $22A_1$. Here, "inside" and "outside" mean inside and outside of the negative electrode 22 in a wound state.

A connecting portion of the negative electrode lead 12 is covered with a protective tape 22C. Further, a portion of the negative electrode current collector exposing portion $22A_1$ that faces the connecting portion of the negative electrode lead 12 is also covered with the protective tape 22C.

The negative electrode lead 12 is preferably connected to the negative electrode current collector exposing portion $22A_1$, and the inclined portion 21N is preferably wound around the connecting portion of the negative electrode lead 12. When the negative electrode lead 12 is connected to the negative electrode current collector exposing portion $22A_1$ so as to be orthogonal to a long side on the first end side of the negative electrode 22, a length L2 of the connecting portion of the negative electrode lead 12 is preferably shorter than the width of the inclined portion 21N in the width direction of the positive electrode 21. Thus, it is possible to further suppress an increase in a thickness of the battery 10 in a portion on the negative electrode lead 12. Therefore, it is possible to further suppress a decrease in cycle characteristics and volume energy density due to a local increase in thickness on the negative electrode lead 12.

It should be understood that it is not preferable to provide the negative electrode 22 with an inclined portion similar to the positive electrode 21.

This is because when the thickness of the negative electrode 22 is reduced, deterioration accompanied by lithium deposition occurs significantly.

The negative electrode current collector 22A includes, for example, a metal such as copper, nickel, or stainless steel. As the shape of the negative electrode current collector 22A, for example, a foil shape, a plate shape, a mesh shape, or the like can be used.

Examples of the negative electrode active material include non-graphitizable carbons, graphitizable carbon, graphite, pyrolytic carbons, cokes, glassy carbons, organic polymer compound fired bodies, carbon fibers, or carbon materials such as activated carbons. Among these, examples of the cokes include pitch coke, needle coke, and petroleum coke. An organic polymer compound fired body refers to a material obtained by firing and carbonizing a polymer material such as a phenol resin or furan resin at an appropriate temperature, and some are classified as non-graphitizable carbon or graphitizable carbon. These carbon materials are preferable because changes in crystal structure that occur during charge and discharge are quite small, a high charge and discharge capacity can be obtained, and favorable cycle characteristics can be obtained. In particular, graphite is preferable because it has a high electrochemical equivalent and can provide a high energy density. Further, non-graphitizable carbon is preferable because excellent cycle characteristics can be obtained.

Furthermore, one having a low charging-discharging potential, specifically, one having a charging-discharging potential close to that of lithium metal is preferable because the battery 10 having a high energy density can be easily achieved.

Further, other negative electrode active materials that can increase the capacity include materials containing at least one of a metal element or a metalloid element as a constituent element (for example, an alloy, a compound, or a mixture). By using such a material, high energy density can be obtained. In particular, when such a material is used together with a carbon material, high energy density can be obtained, and excellent cycle characteristics can be obtained, which is more preferable. Note that in the present disclosure, the alloy includes an alloy containing one or more metal elements and one or more metalloid elements in addition to an alloy constituted of two or more metal elements. Moreover, the alloy may include a nonmetallic element. Some of the structures thereof include a solid solution, an eutectic (eutectic mixture), an intermetallic compound, or a mixture of two or more of them.

Examples of such a negative electrode active material include a metal element or a metalloid element capable of forming an alloy with lithium. Specifically, magnesium, boron, aluminum, titanium, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd), or platinum (Pt) can be mentioned. These may be crystalline or amorphous.

The negative electrode active material preferably includes a group 4B metal element or metalloid element in the short-period periodic table as a constituent element, and more preferably includes at least one of silicon and tin as a constituent element. This is because silicon and tin have a high ability to store and release lithium, and a high energy density can be obtained. Examples of such a negative electrode active material include a simple substance, an alloy or a compound of silicon, a simple substance, an alloy or a compound of tin, or a material having at least a part of one or two or more phases thereof.

Examples of the alloy of silicon include alloys containing, as a second constituent element other than silicon, at least one selected from the group consisting of tin, nickel, copper, iron, cobalt, manganese, zinc, indium, silver, titanium, germanium, bismuth, antimony (Sb), and chromium. Examples of the alloy of tin include alloys containing, as a second constituent element other than tin, at least one selected from the group consisting of silicon, nickel, copper, iron, cobalt, manganese, zinc, indium, silver, titanium, germanium, bismuth, antimony, and chromium.

Examples of the tin compound or the silicon compound include compounds containing oxygen or carbon, and may include the second constituent element described above in addition to tin or silicon.

Among these, as an Sn-based negative electrode active material, an SnCoC-containing material is preferable that includes cobalt, tin, and carbon as constituent elements, having a carbon content of 9.9% by mass or more and 29.7% by mass or less, and having cobalt at a ratio of 30% by mass or more and 70% by mass or less relative to the total of tin and cobalt. This is because a high energy density can be obtained in such a composition range, and excellent cycle characteristics can be obtained.

This SnCoC-containing material may further contain other constituent elements as necessary. As other constituent elements, for example, silicon, iron, nickel, chromium, indium, niobium, germanium, titanium, molybdenum, aluminum, phosphorus (P), gallium, or bismuth are preferable, and two or more kinds may be contained. This is because the capacity or cycle characteristics can be further improved.

This SnCoC-containing material has a phase containing tin, cobalt, and carbon, and this phase preferably has a low crystallinity or an amorphous structure. In this SnCoC-containing material, preferably, at least a part of carbon as a constituent element is bonded to a metal element or a metalloid element as another constituent element. This is because, while a decrease in cycle characteristics is conceivably due to aggregation or crystallization of tin or the like, such aggregation or crystallization can be suppressed by bonding of carbon to other elements.

An example of a measuring method for examining the bonding state of elements is X-ray photoelectron spectroscopy (XPS). In XPS, the peak of carbon is orbital (C1s) appears at 284.5 eV in an apparatus energy-calibrated so that the peak of gold 4f orbital (Au4f) can be obtained at 84.0 eV when it is graphite. Further, when it is a surface contaminated carbon, the peak appears at 284.8 eV. On the other hand, when the charge density of carbon element is high, for example, when carbon is bonded to a metal element or a metalloid element, the C1s peak appears in a region lower than 284.5 eV. That is, when the peak of a synthetic wave of C1s obtained for the SnCoC-containing material appears in a region lower than 284.5 eV, at least a part of carbon contained in the SnCoC-containing material is bonded to a metal element or metalloid that is another constituent element.

It should be understood that in XPS measurement, for example, the C1s peak is used to correct an energy axis of a spectrum. Normally, since a surface contamination carbon exists on the surface, the C1s peak of the surface contamination carbon is set to 284.8 eV, and this is used as an energy standard. In the XPS measurement, the waveform of the C1s peak is obtained as a shape including a peak of the surface contamination carbon and a peak of carbon in the SnCoC-containing material, and thus the peak of the surface contamination carbon and the peak of carbon in the SnCoC-containing material are separated. In an analysis of waveform, the position of a main peak present on a lowest binding energy side is used as an energy reference (284.8 eV).

Examples of other negative electrode active materials include metal oxides, polymer compounds, or the like that can store and release lithium. Examples of the metal oxides include a lithium titanium oxide containing titanium and lithium, such as lithium titanate ($Li_4Ti_5O_{12}$), an iron oxide, a ruthenium oxide, or a molybdenum oxide. Examples of the polymer compounds include polyacetylene, polyaniline, polypyrrole, and the like.

As the binder, for example, at least one selected from resin materials such as polyvinylidene fluoride, polytetrafluoroethylene, polyacrylonitrile, styrene butadiene rubber, and carboxymethyl cellulose, or copolymers mainly constituted of these resin materials is used.

Examples of the conductive agent include carbon materials such as graphite, carbon fiber, carbon black, ketjen black, or carbon nanotube, and one of these may be used alone, or two or more may be mixed and used. Further, in addition to the carbon materials, a metal material or a conductive polymer material may be used as long as it is a conductive material.

The separator 23 separates the positive electrode 21 and the negative electrode 22 and allows lithium ions to pass through while preventing a short circuit of current due to contact between both electrodes. The separator 23 is formed of, for example, a porous film made of resin such as polytetrafluoroethylene, polypropylene, or polyethylene, and may have a structure in which two or more kinds of these porous films are laminated. Among them, a porous film made of polyolefin has an excellent short-circuit preventing effect and can improve safety of the battery 10 by a shutdown effect, and hence is preferable. In particular, polyethylene enables to obtain a shutdown effect within a range of 100° C. or higher and 160° C. or lower and is also excellent in electrochemical stability, and hence is preferable as a material constituting the separator 23. In addition, a material obtained by copolymerizing or blending a resin having chemical stability with polyethylene or polypropylene can be used. Alternatively, the porous film may have a structure of three or more layers in which a polypropylene layer, a polyethylene layer, and a polypropylene layer are sequentially laminated.

Further, the separator 23 may be provided with a resin layer on one side or both sides of a porous film as a base material. The resin layer is a porous matrix resin layer on which an inorganic substance is carried. Thus, oxidation resistance can be obtained and deterioration of the separator 23 can be suppressed. As the matrix resin, for example, polyvinylidene fluoride, hexafluoropropylene (HFP), polytetrafluoroethylene, or the like can be used, and a copolymer thereof can also be used.

As the inorganic substance, a metal, a semiconductor, or an oxide or nitride thereof can be mentioned. Examples of the metal include aluminum, titanium, and the like, and examples of the semiconductor include silicon, boron, and the like. Moreover, as the inorganic substance, one with substantially no electro-conductivity and a large heat capacity is preferable. This is because a large heat capacity is useful as a heat sink when current is generated, and thermal runaway of the battery 10 can be further suppressed. Such inorganic substances include oxides or nitrides such as alumina ($Al_2O_3$), boehmite (alumina monohydrate), talc, boron nitride (BN), aluminum nitride (AlN), titanium dioxide ($TiO_2$), silicon oxide (SiOx), and the like. In addition, the inorganic substance described above may be contained in the porous film as a base material.

The particle size of the inorganic substance is preferably in the range of 1 nm to 10 μm. When the particle size is smaller than 1 nm, the inorganic substance is difficult to obtain, and even when it can be obtained, it is not cost effective. When the particle size is larger than 10 the distance between the electrodes becomes large, and a sufficient charging amount of the active material cannot be obtained in a limited space, resulting in a low battery capacity.

The resin layer can be formed as follows, for example. Specifically, a slurry formed of a matrix resin, a solvent, and an inorganic substance is coated onto a base material (porous film), passed through a poor solvent of the matrix resin and a parent solvent bath of the solvent to undergo phase separation, and then dried.

The positive electrode 21, the negative electrode 22, and the separator 23 are impregnated with an electrolytic solution that is electrolyte. The electrolytic solution contains a solvent and an electrolyte salt dissolved in the solvent. The electrolytic solution may contain a known additive in order to improve battery characteristics.

As the solvent, a cyclic carbonic acid ester such as ethylene carbonate or propylene carbonate can be used, and it is preferable to use one of ethylene carbonate and propylene carbonate, or particularly both by mixture. This is because cycle characteristics can be improved.

As the solvent, in addition to these cyclic carbonic acid esters, it is preferable to use a mixture of chain carbonic acid esters such as diethyl carbonate, dimethyl carbonate, ethylmethyl carbonate, or methylpropyl carbonate. This is because high ionic conductivity can be obtained.

The solvent preferably further contains 2,4-difluoroanisole or vinylene carbonate. This is because 2,4-difluoroanisole can improve discharge capacity, and vinylene carbonate can improve cycle characteristics. Thus, it is preferable to use a mixture of them because discharge capacity and cycle characteristics can be improved.

In addition to them, as the solvent, butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropironitrile, N,N-dimethylformamide, N-methylpyrrolidinone, N-methyloxazolidinone, N,N-dimethyl imidazolidinone, nitromethane, nitroethane, sulfolane, dimethyl sulfoxide, trimethyl phosphate, or the like can be mentioned.

It should be understood that a compound obtained by substituting at least a part of hydrogen in these non-aqueous solvents with fluorine may be preferable because reversibility of electrode reaction can be improved depending on the type of an electrode to be combined.

Examples of the electrolyte salt include lithium salts, and one kind may be used alone, or two or more kinds may be mixed and used. The lithium salts include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxolato-O,O']lithium borate, lithium bisoxalate borate, LiBr, or the like can be mentioned. Among them, $LiPF_6$ is preferable because high ion conductivity can be obtained, and cycle characteristics can be improved.

A positive electrode potential (vsLi/Li$^+$) in a fully charged state is preferably more than 4.20 V, more preferably 4.25 V or more, even more preferably more than 4.40 V, particularly preferably 4.45 V or more, most preferably 4.50 V or more. However, the positive electrode potential (vsLi/Li$^+$) in a fully charged state may be 4.20 V or less. The upper limit of the positive electrode potential (vsLi/Li$^+$) in a fully charged state is not particularly limited, but is preferably 6.00 V or less, more preferably 5.00 V or less, even more preferably 4.80 V or less, and particularly preferably 4.70 V or less.

In the battery 10 having the above-described configuration, when charged, for example, lithium ions are released from the positive electrode active material layers 21B and stored in the negative electrode active material layers 22B through the electrolytic solution. Further, when discharged, for example, lithium ions are released from the negative electrode active material layers 22B, and stored in the positive electrode active material layers 21B through the electrolytic solution.

Next, an example of a configuration of a coating apparatus used for producing the positive electrode 21 will be described.

Figure 5:
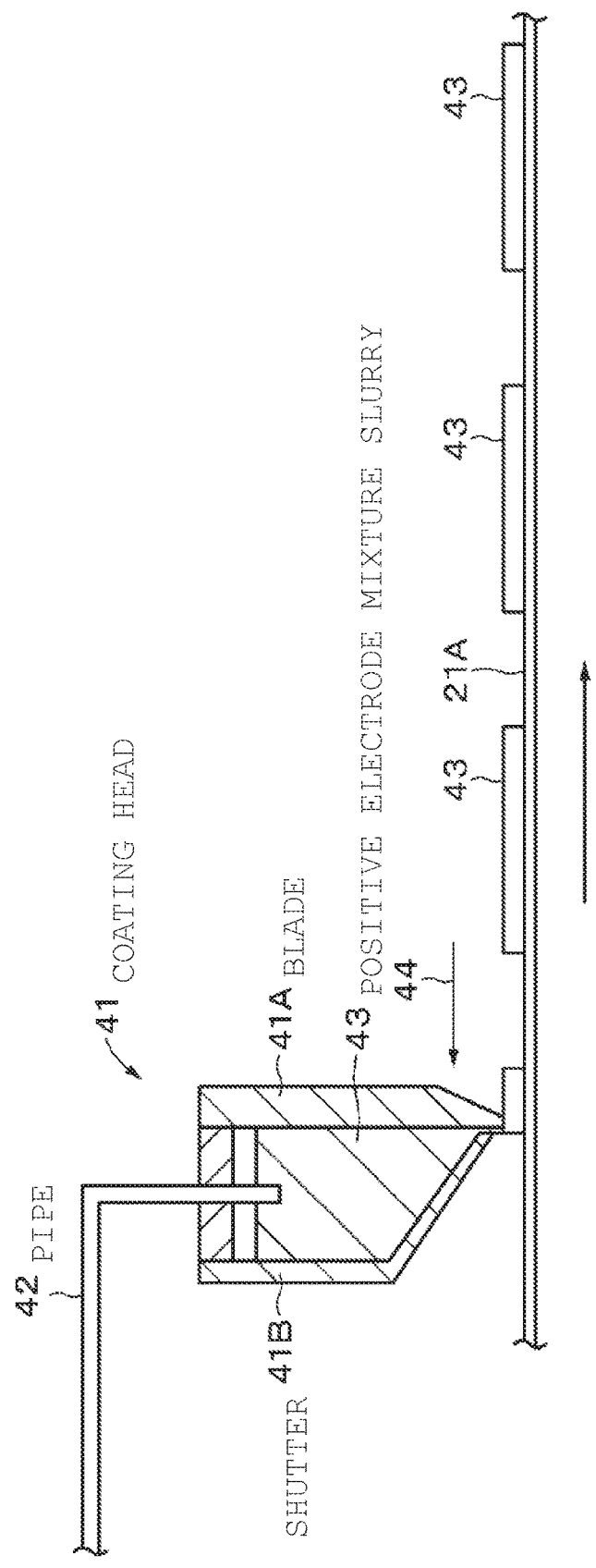
FIG. 5 is a schematic view illustrating an example of a configuration of a coating head according to an embodiment of the present disclosure.

As illustrated in FIG. 5, the coating apparatus includes a coating head 41 and a pipe 42 that supplies a positive electrode mixture slurry 43 as a coating material to the coating head 41. The coating head 41 includes a blade 41A and a shutter 41B provided to face the blade 41A, and an opening that can be opened and closed by movement of the shutter 41B is formed at distal ends of the blade 41A and the shutter 41B.

By opening and closing the opening by the shutter 41B, the positive electrode mixture slurry 43 is intermittently coated onto the traveling positive electrode current collector 21A. A coating thickness of the positive electrode mixture slurry 43 is adjusted according to the distance between the traveling positive electrode current collector 21A and the distal end of the blade 41A. Further, the shape of a coating surface of the positive electrode mixture slurry 43 is adjusted by the shape of the distal end of the blade 41A.

Figure 6A:
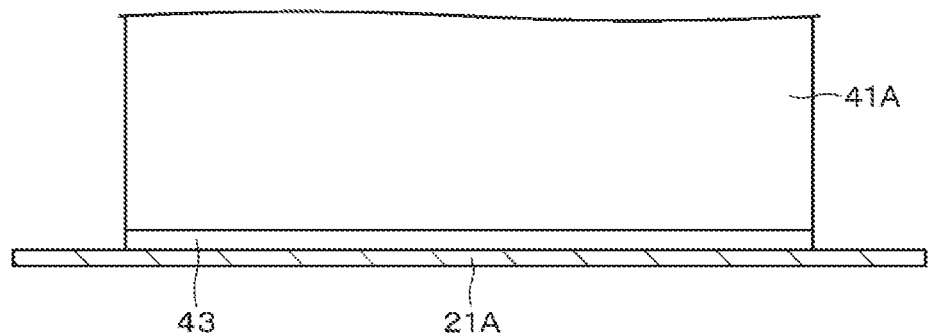
FIG. 6A is a schematic view illustrating a first example of a distal end shape of a blade according to an embodiment of the present disclosure.

FIG. 6A illustrates a first example of the distal end shape of the blade 41A viewed from the direction indicated by an arrow 44 in FIG. 5. In the first example, the distal end of the blade 41A has a linear shape parallel to the coating surface, that is, one surface of the positive electrode current collector 21A.

When the blade 41A having such a shape is used, the coating surface of the positive electrode mixture slurry 43 is a flat surface.

Figure 6B:
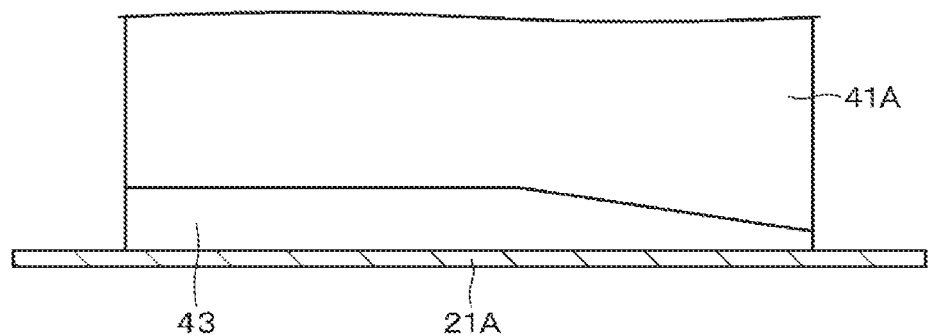
FIG. 6B is a schematic view illustrating a second example of the distal end shape of the blade according to an embodiment of the present disclosure.

FIG. 6B illustrates a second example of the distal end shape of the blade 41A viewed from the direction indicated by the arrow 44 in FIG. 5. In this second example, a part of the distal end of the blade 41A has a linear shape parallel to the coating surface, and another part has a linear shape inclined with respect to the coating surface. That is, the blade 41A has a shape in which the distal end of the blade 41A is cut out in a right trapezoidal shape. By using the blade 41A having such a distal end shape, the positive electrode 21 having the above-described configuration can be produced. Here, the "perpendicular trapezoidal shape" refers to a trapezoid having two adjacent internal angles at right angles.

Next, an example of a battery manufacturing method according to an embodiment of the present disclosure will be described.

The positive electrode 21 is produced as follows. First, for example, a positive electrode active material, a conductive agent, and a binder agent are mixed to prepare a positive electrode mixture, and this positive electrode mixture is dispersed in a solvent such as N-methyl-2-pyrrolidone (NMP) to prepare a positive electrode mixture slurry in a paste form. Next, using the coating apparatus illustrated in FIG. 5, this positive electrode mixture slurry is intermittently coated to both surfaces of the positive electrode current collector 21A having a strip shape. However, the blade having the distal end shape illustrated in FIG. 6B is used. Subsequently, the solvent contained in the coating film is dried, and compression-molded with a roll press or the like to form the positive electrode active material layer 21B.

Thereafter, the positive electrode current collector 21A is cut at a position between adjacent positive electrode active material layers 21B. Thus, the positive electrode 21 having the positive electrode current collector exposing portion 21A$_1$ on both surfaces on the first end side in the longitudinal direction and the positive electrode current collector exposing portion 21A$_2$ on both surfaces on the second end side in the longitudinal direction is produced. Next, the positive electrode lead 11 is connected to the positive electrode current collector exposing portion 21A$_1$ by welding or the like so that the first end side in the longitudinal direction of the positive electrode lead 11 is extended out from the first end side in the width direction of the positive electrode current collector exposing portion 21A$_1$. Subsequently, the first ends of the positive electrode current collector exposing portion 21A$_1$ and the positive electrode active material layers 21B on the first end side in the longitudinal direction are covered with the protective tape 21C, and the second ends of the positive electrode current collector exposing portion 22A$_2$ and the positive electrode active material layer 21B on the second end side in the longitudinal direction are covered with the protective tape 21D.

The negative electrode 22 is produced as follows. First, for example, a negative electrode active material and a binder agent are mixed to prepare a negative electrode mixture, and this negative electrode mixture is dispersed in a solvent such as N-methyl-2-pyrrolidone to make a negative electrode mixture slurry in a paste form. Next, the negative electrode mixture slurry is intermittently coated to both surfaces of the negative electrode current collector 22A having a strip shape and dried, and compression molding is performed by a roll press machine or the like to form the negative electrode active material layers 22B. Thereafter, the positive electrode current collector 21A is cut at a position between adjacent negative electrode active material layers 22B. Thus, the positive electrode 21 having the negative electrode current collector exposing portions 22A$_1$ on both surfaces on the first end side in the longitudinal direction and the negative electrode current collector exposing portions 22A$_2$ on both surfaces on the second end side in the longitudinal direction is produced. Next, the negative electrode lead 12 is connected to the negative electrode current collector exposing portion 22A$_1$ by welding or the like so that the first end side in the longitudinal direction of the negative electrode lead 12 is extended out from the first end side in the width direction of the negative electrode current collector exposing portion 22A$_1$. Thereafter, the connecting portion of the negative electrode lead 12 is covered with the protective tape 22C, and a portion of the negative electrode current collector exposing portion 22A$_1$ that faces the connecting portion of the negative electrode lead 12 after winding is covered with the protective tape 22C.

First, the positive electrode 21 and the negative electrode 22 are wound around a flat core with the separator 23 interposed therebetween and wound many times in the longitudinal direction to produce the wound electrode body 20. Next, an outer peripheral side end portion of the positive electrode 21 as an outermost peripheral electrode is fixed by the winding stop tape 24.

First, for example, the wound electrode body 20 is sandwiched between exterior members 30 having flexibility, and an outer peripheral edge except for one side is heat-sealed into a bag shape and stored inside the exterior members 30.

At that time, an adhesive film 31 is inserted between the positive electrode and negative electrode leads 11, 12 and the exterior member 30. Next, an electrolytic solution is prepared and poured into the exterior members 30 from the one side that is not heat sealed. Next, the wound electrode body 20 is sealed by heat-sealing the one side in a vacuum atmosphere. In this manner, the battery 10 accommodated in the exterior members 30 is obtained.

First, the battery 10 is molded by heat pressing as necessary. More specifically, the battery 10 is heated at a temperature higher than room temperature while being pressurized. Next, if necessary, a pressure plate or the like is pressed against a main surface of the battery 10 to press the battery 10 uniaxially.

The battery 10 according to the first embodiment includes a positive electrode 21 having a strip shape and having a positive electrode lead 11 and a negative electrode 22 having a strip shape and having a negative electrode lead 12. The positive electrode 21 and the negative electrode 22 are wound in a flat shape so that first ends in a longitudinal direction of the positive electrode 21 and the negative electrode 22 are on an inner peripheral side and second ends in the longitudinal direction thereof are on an outer peripheral side. Further, the positive electrode and negative electrode leads 11, 12 are extended out from first end sides in a width direction of the positive electrode 21 and the negative electrode 22. In addition, a thickness of the positive electrode 21 on the first end side in the width direction is thinner than a thickness of the positive electrode 21 on a second end side in the width direction. Thus, since a local increase in thickness on the positive electrode lead 11 and the negative electrode lead 12 can be suppressed, it is possible to suppress deterioration of cycle characteristics. Further, a decrease in volume energy density of the battery 10 due to a local increase in thickness on the positive electrode lead 11 and the negative electrode lead 12 can be suppressed.

Figure 8:
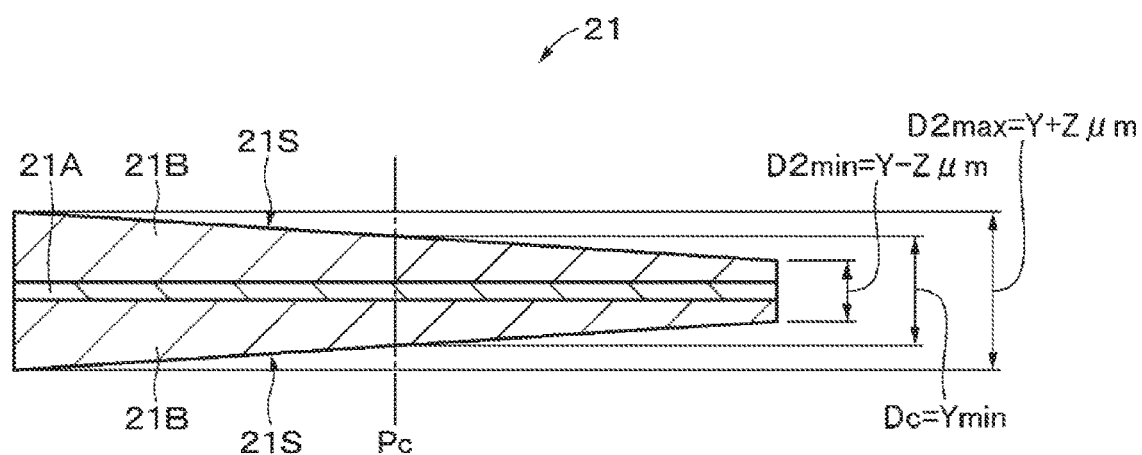
FIG. 8 is a cross-sectional view taken along a line VIII-VIII in FIG. 7B.

As illustrated in FIGS. 7A, 7B, and 8, the positive electrode active material layers 21B may have an inclined surface 21S that gradually decreases in thickness from the second end toward the first end in the width direction of the positive electrode 21. For example, when a thickness of the positive electrode 21 at a central position Pc in the width direction is Y μm, the thickness of the positive electrode 21 changes in the range of (Y−Z) to (Y+Z) μm with respect to the width direction of the positive electrode 21. In this case, a maximum thickness $D2_{max}$ of the positive electrode 21 is (Y+Z) μm, and a minimum thickness D2 min of the positive electrode 21 is (Y−Z).

The positive electrode 21 preferably satisfies the following relational expression (2).

$$-0.3 \leq X2 < 1 \qquad (2)$$

(Here, $X2=(((D2_{min}+d)-(D2_{max} \times N))/d$, $D2_{min}$ is a minimum thickness of the positive electrode 21, $D2_{max}$ is a maximum thickness of the positive electrode 21, N is the number of windings of the positive electrode 21, and d is a thickness of the positive electrode lead 11)

When the positive electrode 21 satisfies the above relational expression (2), it is possible to further suppress a decrease in cycle characteristics and volume energy density due to a local increase in thickness on the positive electrode lead 11.

Further, the positive electrode 21 preferably satisfies the following relational expression (4).

$$-0.3 \leq X4 < 1 \qquad (4)$$

(Here, $X4=(((D2_{min}+d')-(D2_{max} \times N))/d'$, $D2_{min}$ is a minimum thickness of the positive electrode 21, $D2_{max}$ is a maximum thickness of the positive electrode 21, N is the number of windings of the positive electrode 21, and d' is a thickness of the negative electrode lead 12)

When the positive electrode 21 satisfies the above relational expression (4), it is possible to further suppress a decrease in cycle characteristics and volume energy density due to a local increase in thickness on the negative electrode lead 12.

The thicknesses $D2_{min}$ and $D2_{max}$ are measured in a procedure similar to that when the thicknesses $D1_{min}$ and $D1_{max}$ are measured in the above-described embodiment.

Figure 9:
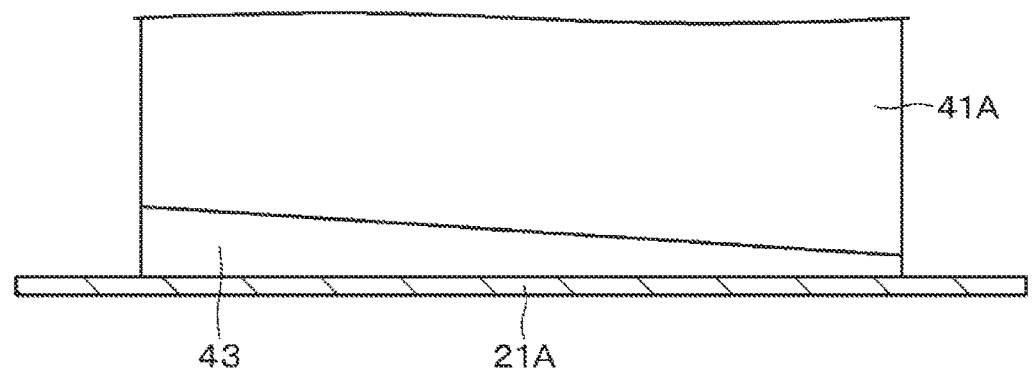
FIG. 9 is a schematic view illustrating a third example of a distal end shape of a blade according to an embodiment of the present disclosure.

FIG. 9 illustrates a third example of the distal end shape of the blade 41A viewed from the direction indicated by the arrow 44 in FIG. 5. In the third example, the distal end of the blade 41A has a linear shape that is oblique to the coating surface. By using the blade 41A having such a distal end shape, the positive electrode 21 having the above-described configuration can be produced.

The inclined portion 21N may have an inclined surface that is concavely curved with respect to the positive electrode current collector 21A as illustrated in FIG. 10A, or may have an inclined surface that is convexly curved with respect to the positive electrode current collector 21A as illustrated in FIG. 10B.

As illustrated in FIG. 10C, the positive electrode active material layer 21B may have a flat portion (second flat portion) 21V parallel to the surface of the positive electrode current collector 21A instead of the inclined portion 21N. In this case, the thickness of the positive electrode 21 in the flat portion 21V is thinner than the thickness of the positive electrode 21 in the flat portion (first flat portion) 21M. Note that the flat portion 21V is an example of a thin portion having a flat surface.

As illustrated in FIG. 10D, the positive electrode active material layer 21B may have a step portion 21W instead of the inclined portion 21N. In this case, the step portion 21W has a stepped surface that descends in the direction from the second end to the first end of the positive electrode 21 so that the thickness of the positive electrode active material layer 21B decreases. Note that each step constituting the stepped surface may be a flat surface parallel to the surface of the positive electrode current collector 21A, or an inclined surface inclined with respect to the surface of the positive electrode current collector 21A, or it may be a curved surface curved in a convex shape or a concave shape with respect to the surface of the positive electrode current collector 21A.

As illustrated in FIG. 10E, only one positive electrode active material layer 21B of the pair of positive electrode active material layers 21B provided on both surfaces of the positive electrode current collector 21A may have an inclined portion 21N. In addition, when thin portions are provided on both surfaces of the positive electrode current collector 21A, shapes or configurations of the thin portions provided on the both surfaces may be different.

For example, a thin portion provided on one surface may be the inclined portion 21N, and a thin portion provided on the other surface may be the step portion 21W. Further, the inclined portion 21N may be provided only in a portion of the positive electrode 21 that overlaps the positive electrode lead 11 and the negative electrode lead 12.

The positive electrode lead 11 may be provided in a portion other than the inner peripheral side of the positive electrode 21 (for example, an outer peripheral side portion or a middle peripheral portion). Further, the negative electrode lead 12 may be provided on a portion other than the inner peripheral side of the negative electrode 22 (for example, an outer peripheral side portion or a middle peripheral portion). However, the present disclosure is particularly effective when the positive electrode and negative electrode leads 11, 12 are provided on the inner peripheral sides of the positive electrode 21 and the negative electrode 22, respectively.

One of both main surfaces of the positive electrode lead 11 that is opposite to the side connected to the positive electrode current collector exposing portion $21A_1$ may have an inclined portion. In this case, the inclined portion has an inclined surface with a thickness increasing from a second end side in the longitudinal direction joined to the positive electrode 21 to a first side opposite to the second end side. Note that the inclined portion may be provided only in a portion sandwiched between the wound electrode bodies 20, or may be provided up to a position outside the portion sandwiched between the wound electrode bodies 20. Further, the positive electrode lead 11 may have an inclined surface over the entire range from the first end to the second end in the longitudinal direction. Since the positive electrode lead 11 has such an inclined surface, an increase in the thickness of the battery 10 in the portion on the positive electrode lead 11 can be further suppressed. Further, the negative electrode lead 12 may have an inclined portion similar to that of the positive electrode lead 11.

The positive electrode lead 11 may have a step portion instead of the inclined portion. In this case, the step portion has a stepped surface that rises from the second end side in the longitudinal direction joined to the positive electrode 21 so that the thickness of the positive electrode lead 11 increases in the direction of the first side opposite to the second end side. Further, the negative electrode lead 12 may have a step portion similar to the positive electrode lead 11.

In the above-described embodiment, the case where the battery 10 is a lithium ion secondary battery has been described, but the type of the battery 10 is not limited to this. For example, a lead storage battery, a lithium ion polymer secondary battery, an all solid state battery, a nickel-hydrogen battery, a nickel-cadmium battery, a nickel-iron battery, a nickel-zinc battery, a silver oxide-zinc battery, or the like may be used.

In the above-described embodiment, although the configuration in which the wound electrode body 20 having a flat shape is accommodated in the exterior member 30 has been described, the shape of the wound electrode body 20 is not limited thereto, and may be, for example, a columnar shape or a polyhedral shape such as a cubic shape may be used.

The battery 10 is not limited to a general battery having rigidity, and may be a flexible battery that can be mounted on a wearable terminal such as a smart watch, a head mounted display, or iGlass (registered trademark).

In the above-described embodiment, the example in which the present disclosure is applied to the battery 10 including the electrolytic solution as electrolyte has been described, but the electrolyte is not limited thereto. For example, the battery 10 may include an electrolyte layer including an electrolytic solution and a polymer compound serving as a holding body that holds the electrolytic solution between the positive electrode 21 and the separator 23 and between the negative electrode 22 and the separator 23. In this case, the electrolyte may be in a gel form.

The electrolytic solution is similar to the electrolytic solution according to the first embodiment. Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, or polycarbonate. Particularly, from the viewpoint of electrochemical stability, polyacrylonitrile, polyvinylidene fluoride, polyhexafluoropropylene, or polyethylene oxide is preferred.

It should be understood that an inorganic substance similar to the inorganic substances described in the description of the resin layer of the separator 23 in the above-described embodiment may be included in the electrolyte layer. This is because heat resistance can be further improved.

In the above-described embodiment, the case where the positive electrode and negative electrode leads 11, 12 are led out from the top side of the exterior member 30 has been described, but the electrode leads may also be led out from a lateral side or from the bottom side. Note that when the positive electrode lead 11 and the negative electrode lead are led out from the bottom side, a configuration may be employed in which the wound electrode body 20 is sandwiched between two rectangular outer exterior members 30, and four sides of the two outer exterior members 30 are sealed. Further, the positive electrode lead 11 and the negative electrode lead 12 may be led out in different directions.

"Battery pack and electronic device as application example" In Application Example 1, a battery pack and an electronic device including the battery according to the above-described embodiment or modification examples thereof will be described.

Figure 11:
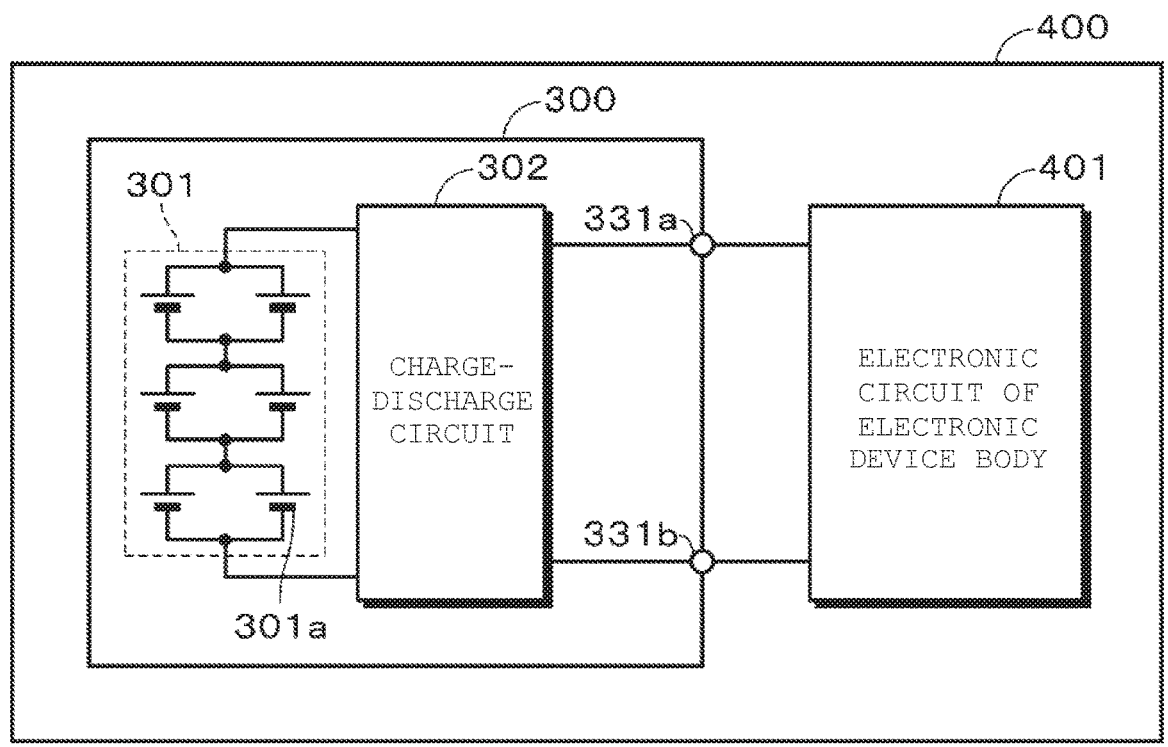
FIG. 11 is a block diagram illustrating an example of a configuration of an electronic device as an application example according to an embodiment of the present disclosure.

Hereinafter, a configuration example of a battery pack 300 and an electronic device 400 as application examples will be described with reference to FIG. 11. The electronic device 400 includes an electronic circuit 401 of an electronic device body and a battery pack 300. The battery pack 300 is electrically connected to the electronic circuit 401 with a positive electrode terminal 331a and a negative electrode terminal 331b interposed therebetween. For example, the electronic device 400 has a configuration in which the battery pack 300 can be freely attached and detached by a user. Note that the electronic device 400 is not limited to this configuration, and may have a configuration in which the battery pack 300 is built in the electronic device 400 so that the user cannot remove the battery pack 300 from the electronic device 400.

When the battery pack 300 is charged, the positive electrode terminal 331a and the negative electrode terminal 331b of the battery pack 300 are connected to a positive electrode terminal and a negative electrode terminal of a charger (not illustrated), respectively. On the other hand, when the battery pack 300 is discharged (when the electronic device 400 is in use), the positive electrode terminal 331a and the negative electrode terminal 331b of the battery pack 300 are connected to the positive electrode terminal and the negative electrode terminal of the electronic circuit 401, respectively.

Examples of the electronic device 400 include laptop personal computers, tablet computers, mobile phones (for example, smartphones), personal digital assistants (PDA), display devices (LCD, EL display, electronic paper, or the like), imaging devices (for example, digital still cameras, digital video cameras, or the like), audio devices (for example, portable audio players), game machines, cordless handsets, electronic books, electronic dictionaries, radios, headphones, navigation systems, memory cards, pacemakers, hearing aids, electric tools, electric shavers, refrigerators, air conditioners, TVs, stereos, water heaters, microwave ovens, dishwashers, washing machines, dryers, lighting devices, toys, medical devices, robots, load conditioners, traffic lights, and the like, but not limited thereto.

The electronic circuit 401 includes, for example, a CPU, a peripheral logic unit, an interface unit, a storage unit, and the like, and controls the entire electronic device 400.

The battery pack 300 includes an assembled battery 301 and a charge-discharge circuit 302. The assembled battery 301 is configured by connecting a plurality of secondary batteries 301a in series and/or in parallel. The plurality of secondary batteries 301a are connected, for example, n in parallel and m in series (n and m are positive integers). Note that FIG. 11 illustrates an example in which six secondary batteries 301a are connected, two in parallel and three in series (2P3S). As the secondary batteries 301a, the battery 10 according to the above-described embodiment or modification example thereof is used.

Here, the case where the battery pack 300 includes an assembled battery 301 including a plurality of secondary batteries 301a will be described, but a configuration in which the battery pack 300 includes a single secondary battery 301a instead of the assembled battery 301 may be employed.

The charge-discharge circuit 302 is a control unit that controls charging and discharging of the assembled battery 301. Specifically, during charging, the charge-discharge circuit 302 controls charging of the assembled battery 301. On the other hand, when discharging (that is, when the electronic device 400 is in use), the charge-discharge circuit 302 controls discharging to the electronic device 400.

"Power Storage System in Vehicle as Application Example"

Figure 12:
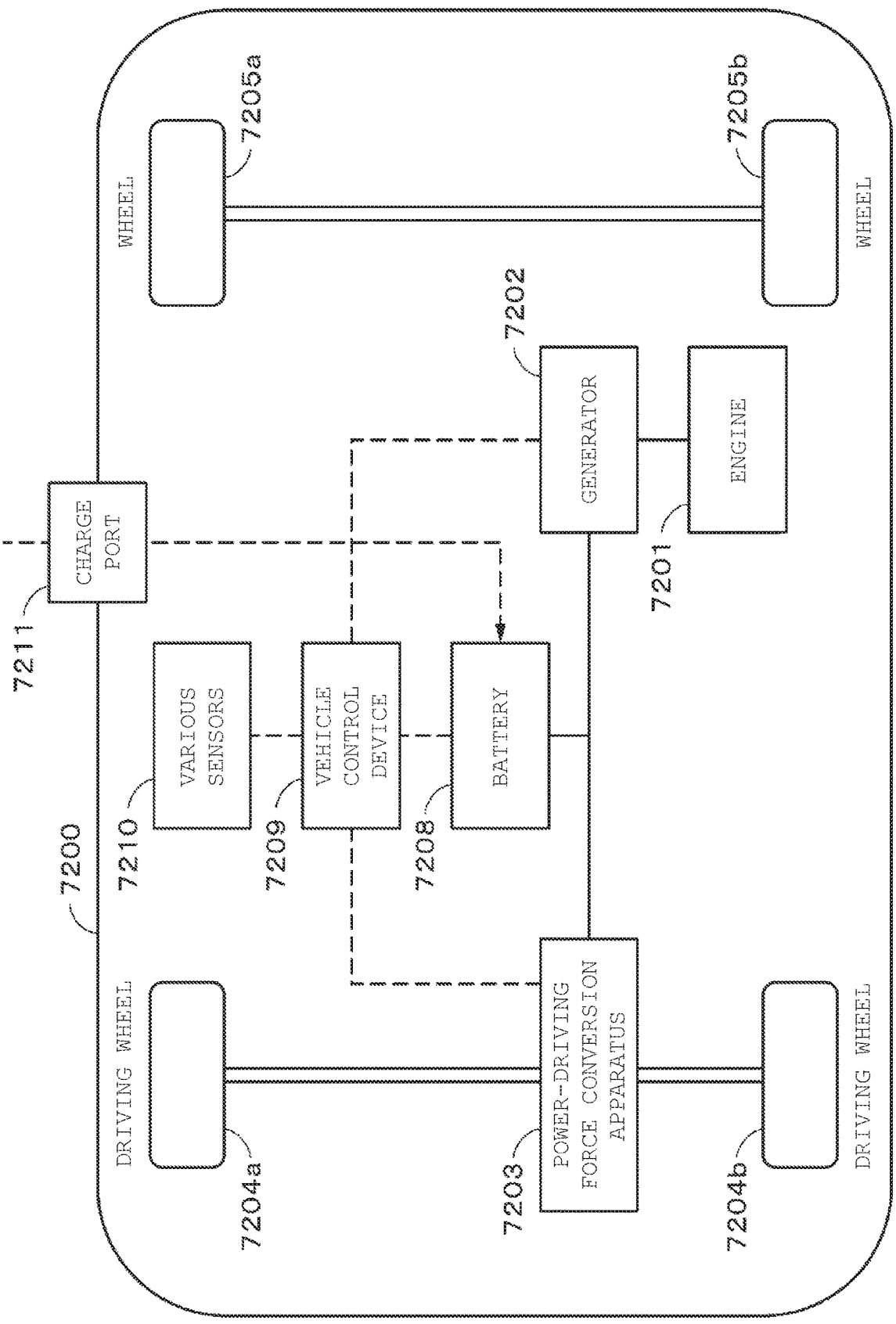
FIG. 12 is a schematic diagram illustrating an example of a configuration of a vehicle as an application example according to an embodiment of the present disclosure.

An example in which the present disclosure is applied to a power storage system for a vehicle will be described with reference to FIG. 12. FIG. 12 schematically illustrates an example of a configuration of a hybrid vehicle that employs a series hybrid system to which the present disclosure is applied. The series hybrid system is a car that runs by a power-driving force conversion apparatus using power generated by a generator driven by an engine or power once stored in a battery.

This hybrid vehicle 7200 is provided with an engine 7201, a generator 7202, a power-driving force conversion apparatus 7203, a driving wheel 7204*a*, a driving wheel 7204*b*, a driving wheel 7205*a*, a driving wheel 7205*b*, a battery 7208, a vehicle control device 7209, various sensors 7210, and a charge port 7211. The above-described power storage device of the present disclosure is applied to the battery 7208.

The hybrid vehicle 7200 runs using the power-driving force conversion apparatus 7203 as a power source. An example of the power-driving force conversion apparatus 7203 (converter) is a motor. The power-driving force conversion apparatus 7203 is operated by power of the battery 7208, and rotational force of the power-driving force conversion apparatus 7203 is transmitted to the driving wheels 7204*a*, 7204*b*. It should be understood that also by using direct current-alternate current (DC-AC) or reverse conversion (AC-DC conversion) where necessary, the power-driving force conversion apparatus 7203 can be applied to either an AC motor or a DC motor. The various sensors 7210 control the engine speed through the vehicle control device 7209, and control opening (throttle opening) of a throttle valve that is not illustrated. The various sensors 7210 include a speed sensor, an acceleration sensor, an engine speed sensor, and the like.

The rotational force of the engine 7201 is transmitted to the generator 7202, and power generated by the generator 7202 from the rotational force can be stored in the battery 7208.

When the hybrid vehicle decelerates by a braking mechanism that is not illustrated, resistance force during the deceleration is applied as rotational force to the power-driving force conversion apparatus 7203, and regenerative power generated by the power-driving force conversion apparatus 7203 from this rotational force is stored in the battery 7208.

By being connected to a power source outside the hybrid vehicle, the battery 7208 can be supplied with power from the external power source through the charge port 7211 as an input port, and can also store the received power.

Although not illustrated, an information processing device that performs information processing related to vehicle control based on information related to the secondary battery may be provided. As such an information processing device, for example, there is an information processing device that displays a remaining battery level based on information related to the remaining level of the battery.

It should be understood that in the above description, a series hybrid vehicle running with a motor using power generated by a generator driven by an engine or power stored once in a battery has been described as an example. However, the present disclosure is also effectively applicable to a parallel hybrid vehicle that uses outputs of both the engine and the motor as drive sources, and switches between three modes: running with the engine alone, running with the motor alone, and running with the engine and the motor. Furthermore, the present disclosure is also effectively applicable to what is called an electric vehicle that is driven only by a drive motor to run without using an engine.

The example of the hybrid vehicle 7200 to which the technology according to the present disclosure can be applied has been described above. The technology according to the present disclosure can be preferably applied to the battery 7208 among the configurations described above.

"Power Storage System in House as Application Example"

Figure 13:
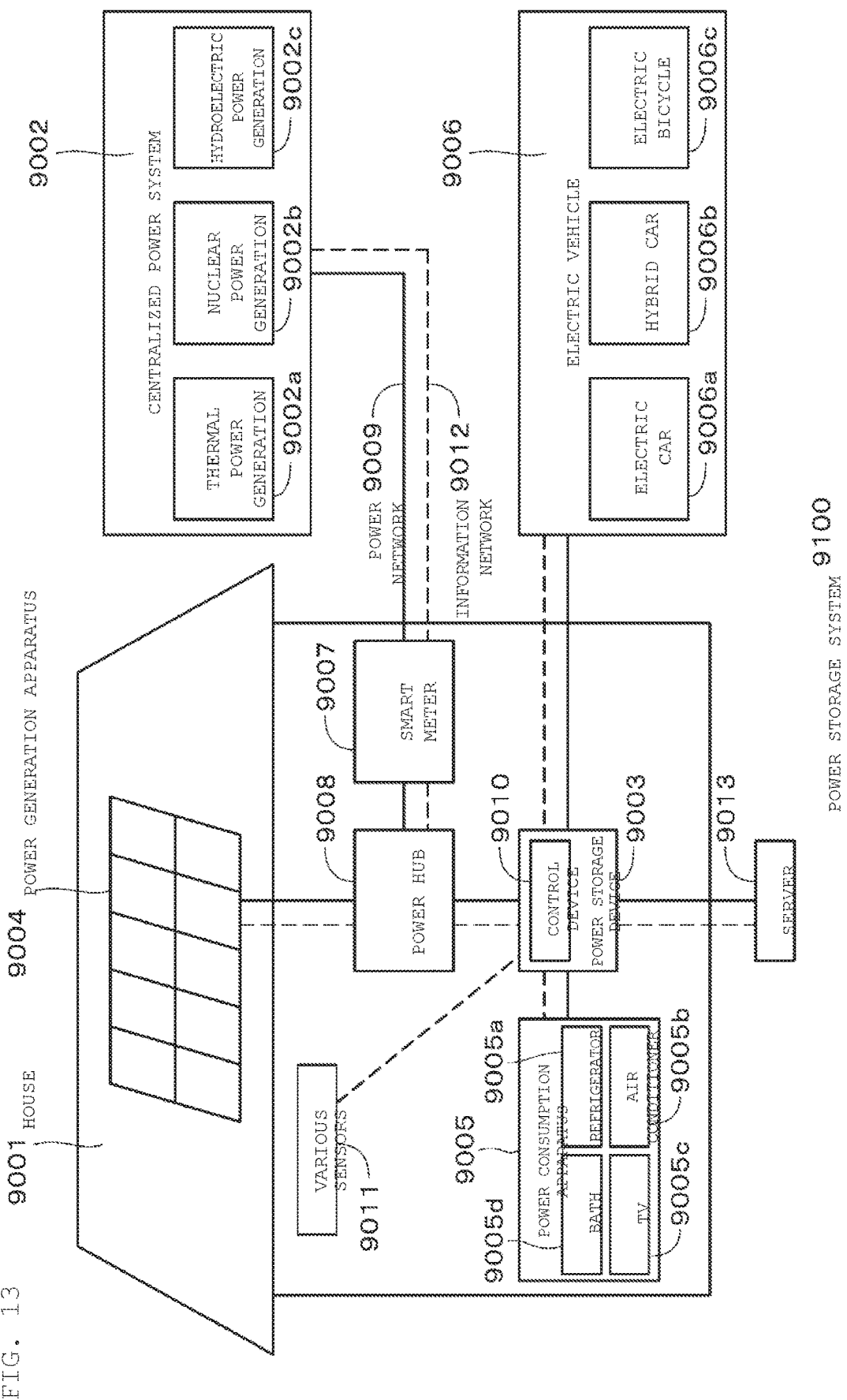
FIG. 13 is a schematic diagram illustrating an example of a configuration of a power storage system as an application example according to an embodiment of the present disclosure.

An example in which the present disclosure is applied to a power storage system for a house will be described with reference to FIG. 13. For example, in a power storage system 9100 for a house 9001, power is supplied to the power storage device 9003 from a centralized power system 9002 such as thermal power generation 9002*a*, nuclear power generation 9002*b*, and hydroelectric power generation 9002*c* via a power network 9009, an information network 9012, a smart meter 9007, a power hub 9008, and/or the like. At the same time, power is supplied to the power storage device 9003 from an independent power source such as a home power generation apparatus 9004. The power supplied to the power storage device 9003 is stored. Power used in the house 9001 is supplied using the power storage device 9003. A similar power storage system can be used not only for the house 9001 but also for buildings.

The house 9001 is provided with a power generation apparatus 9004, a power consumption apparatus 9005, a power storage device 9003, a control device 9010 (controller) that controls respective devices, a smart meter 9007, and a sensor 9011 that obtains various types of information. The respective devices are connected by a power network 9009 and an information network 9012. As the power generation apparatus 9004, a solar cell, a fuel cell, or the like is used, and generated power is supplied to the power consumption apparatus 9005 and/or the power storage device 9003. The power consumption apparatus 9005 is a refrigerator 9005*a*, an air conditioner 9005*b*, a television receiver 9005*c*, a bath 9005*d*, and the like. Further, the power consumption apparatus 9005 includes an electric vehicle 9006. The electric vehicle 9006 is an electric car 9006*a*, a hybrid car 9006*b*, and an electric motorcycle 9006*c*.

The above-described battery unit of the present disclosure is applied to the power storage device 9003. The power storage device 9003 is constituted of a secondary battery or a capacitor.

For example, it is constituted of a lithium ion battery. The lithium ion battery may be a stationary type or one used in the electric vehicle 9006. The smart meter 9007 has a function of measuring the amount of commercial power used and transmitting the measured amount used to an electric power company. The power network 9009 may combine one or more of direct current feed, alternating current feed, or non-contact feed.

The various sensors 9011 are, for example, a human sensor, an illuminance sensor, an object detection sensor, a power consumption sensor, a vibration sensor, a contact sensor, a temperature sensor, an infrared sensor, and the like. Information obtained by the various sensors 9011 is transmitted to the control device 9010. Based on information from the sensor 9011, weather conditions, conditions of a person, and the like can be comprehended, and the power consumption apparatus 9005 can be automatically controlled to minimize the energy consumption. Furthermore, the control device 9010 can transmit information on the house 9001 to an external power company or the like via the Internet.

The power hub 9008 performs processing such as branching of power lines and DC-AC conversion. As a communication method of the information network 9012 connected to the control device 9010, there is a method using a communication interface such as Universal Asynchronous Receiver-Transmitter (UART), or a method using a sensor network based on a wireless communication standard such as Bluetooth (registered trademark), ZigBee (registered trademark), or Wi-Fi. The Bluetooth (registered trademark) system is applied to multimedia communication and can perform one-to-many connection communication. ZigBee (registered trademark) uses the physical layer of IEEE (Institute of Electrical and Electronics Engineers) 802.15.4. IEEE802.15.4 is the name of a short-range wireless network standard called PAN (Personal Area Network) or W (Wireless) PAN.

The control device 9010 is connected to a server 9013 of the outside. The server 9013 may be managed by any one of the house 9001, a power company, and a service provider. Information transmitted or received by the server 9013 is, for example, power consumption information, life pattern information, power charges, weather information, natural disaster information, and information on power trades. These pieces of information may be transmitted and received from a power consumption apparatus inside a house (for example, a television receiver), but may be transmitted and received from a device outside the house (for example, a cellular phone or the like). These pieces of information may be displayed on a device having a display function, for example, a television receiver, a mobile phone, a PDA (Personal Digital Assistants), or the like.

A control device 9010 that controls each unit is constituted of a central processing unit (CPU), a random access memory (RAM), a read only memory (ROM), and so on, and is accommodated in the power storage device 9003 in this example. The control device 9010 is connected to the power storage device 9003, the home power generation apparatus 9004, the power consumption apparatus 9005, the various sensors 9011, and the server 9013 by the information network 9012, and has, for example, a function of adjusting the amount of commercial power used and the amount of power generated. In addition, it may be provided with a function of performing a power trade in an electricity market, or the like.

As described above, electric power is not only the centralized power system 9002 such as the thermal power 9002a, the nuclear power 9002b, and the hydropower 9002c, but generated power of the home power generation apparatus 9004 (solar power generation, or wind power generation) can be stored in the power storage device 9003.

Therefore, even when generated power of the home power generation apparatus 9004 fluctuates, it is possible to perform control such that the amount of power sent to the outside is constant or discharged as necessary. For example, the power storage system can be used such that power obtained by solar power generation is stored in the power storage device 9003 and midnight power at a low electricity charge is stored in the power storage device 9003 at night, and the power stored in the power storage device 9003 is discharged and used in a time zone of the daytime at a high electricity charge.

It should be understood that although an example in which the control device 9010 is stored in the power storage device 9003 has been described in this example, it may be stored in the smart meter 9007 or may be configured alone. Furthermore, the power storage system 9100 may be used for a plurality of homes in an apartment house, or may be used for a plurality of detached houses.

An example of the power storage system 9100 to which the technology according to the present disclosure can be applied has been described above. The technology according to the present disclosure can be preferably applied to the secondary battery included in the power storage device 9003 among the configurations described above.

Hereinafter, the present disclosure will be specifically described by way of examples, but the present disclosure is not limited to these examples.

In this example, D1 min, $D1_{max}$, $D2_{min}$, and $D2_{max}$ are measured by the procedure described in the above-described embodiment and modification examples thereof. Further, a thickness Dc of the positive electrode at the central position Pc in the width direction is also measured in a procedure similar to that for $D1_{min}$, $D1_{max}$, $D2_{min}$, and $D2_{max}$.

Examples 1 to 7

The positive electrode was produced as follows. First, lithium carbonate ($Li_2CO_3$) and cobalt carbonate ($CoCO_3$) were mixed at a molar ratio of 0.5:1, and then fired in air at 900° C. for 5 hours to obtain a lithium cobalt composite oxide (positive electrode active material) $LiCoO_2$) as a positive electrode active material. Next, 91 parts by mass of the lithium cobalt composite oxide obtained as described above, 6 parts by mass of graphite as a conductive agent, and 3 parts by mass of polyvinylidene fluoride as a binder agent were mixed to prepare a positive electrode mixture, and then the resultant was dispersed in N-methyl-2-pyrrolidone to obtain a positive electrode mixture slurry in a paste form.

Next, the positive electrode mixture slurry was coated to both surfaces of a positive electrode current collector made of an aluminum foil (width 100 mm, thickness 12 μm) having a strip shape. At this time, a blade having the distal end shape illustrated in FIG. 6B was used as the blade of the coating head, and coating of the positive electrode mixture slurry was adjusted so that $D1_{min}$ of the finally obtained positive electrode is in the range of 93.0 to 99.0 μm and $D1_{max}$ is 100 μm. Further, the coating of the positive electrode mixture slurry was adjusted so that a positive electrode current collector exposing portion is formed on both end sides in a longitudinal direction of the both surfaces of the positive electrode current collector. Next, after drying the coated positive electrode mixture slurry, the positive electrode active material layer was formed by compression molding with a roll press.

Thereafter, the positive electrode current collector was cut at a position between adjacent positive electrode active material layers. Thus, a positive electrode was produced that has positive electrode current collector exposing portions on both surfaces on a first end side in a longitudinal direction and positive electrode current collector exposing portions on both surfaces on a second end side in the longitudinal direction. Next, a positive electrode lead made of aluminum having a thickness of 100 μm was connected by welding to a positive electrode current collector exposing portion on an inner peripheral side (first end side) after winding. Note that a length L1 of a connecting portion of the positive electrode lead connected to the positive electrode current collector was adjusted to be 30 mm.

Subsequently, a protective tape for preventing a short circuit was applied so as to cover ends of four positive electrode active material layers, and an additional protective tape for eliminating the step was applied as necessary.

The negative electrode was produced as follows. First, 97 parts by mass of artificial graphite powder as a negative electrode active material and 3 parts by mass of polyvinylidene fluoride as a binder agent were mixed to form a negative electrode mixture, and then dispersed in N-methyl-2-pyrrolidone to obtain a negative electrode mixture slurry in a paste form. Next, the negative electrode mixture slurry was coated to both surfaces of a negative electrode current collector made of a copper foil (10 μm thick) having a strip shape. At this time, coating of the negative electrode mixture slurry was adjusted so that a negative electrode current collector exposing portion is formed on both end sides in a longitudinal direction of both surfaces of the negative electrode current collector.

Next, after drying the coated negative electrode mixture slurry, the negative electrode active material layer was formed by compression molding with a roll press. Thereafter, the negative electrode current collector was cut at a position between adjacent negative electrode active material layers. Thus, a negative electrode was produced that has negative electrode current collector exposing portions on both surfaces on the first end side in the longitudinal direction and negative electrode current collector exposing portions on both surfaces on the second end side in the longitudinal direction.

Next, a negative electrode lead made of nickel having a thickness of 80 μm was connected by welding to a negative electrode current collector exposing portion on an inner peripheral side (first end side) after winding. Note that a length L2 of a connecting portion of the negative electrode lead connected to the negative electrode current collector was adjusted to be 15 mm. Subsequently, a protective tape was applied to the negative electrode current collector exposing portions so as to cover the negative electrode lead, and a protective tape was also applied to a portion facing the connecting portion of the negative electrode lead after winding, and further an additional protective tape for eliminating the step was applied as necessary.

A lamination type battery was produced as follows. First, the produced positive electrode and negative electrode were brought into a close contact with a separator interposed therebetween that is made of a microporous polyethylene film having a thickness of 15 μm, and were wound in the longitudinal direction using a flat core, and a winding stop tape was attached to an outermost peripheral portion, thereby producing a flat wound electrode body. Note that the number of windings (turns) of the positive electrode was 13 times. Next, this wound electrode body was placed between exterior members, and three sides of the exterior members were heat sealed, and one side was not heat sealed so as to have an opening. As the exterior members, a moisture-proof aluminum laminated film was used, in which a 25 μm-thick nylon film, a 40 μm-thick aluminum foil, and a 30 μm-thick polypropylene film were laminated in order from the outermost layer.

First, ethylene carbonate (EC), propylene carbonate (PC), diethyl carbonate (DEC), and vinylene carbonate (VC) were mixed so that the mass ratio of EC:PC:DEC:VC is 20:20:59:1, thereby preparing a mixed solvent. Next, lithium hexafluorophosphate ($LiPF_6$) as an electrolyte salt was dissolved in this mixed solvent so as to be 1.0 mol/kg, thereby preparing an electrolytic solution. This electrolytic solution was injected through the opening of the exterior member, and the remaining one side of the exterior member was tightly heat-sealed under reduced pressure. Next, the wound electrode body obtained by sealing the wound electrode body was heated while applying pressure, so as to integrate the positive electrode, the negative electrode, and the separator constituting the battery element. Thus, a target laminated film type battery (hereinafter simply referred to as "battery") was obtained.

Examples 8 to 14

Batteries were obtained similarly to Examples 1 to 7 except that the length L1 of the connecting portion of the positive electrode lead connected to the positive electrode current collector was changed to 60 mm.

Examples 15 to 21

Batteries were obtained similarly to Examples 1 to 7 except that the thickness d of the positive electrode lead was changed to 60 μm.

Examples 22 to 28

Batteries were obtained similarly to Examples 1 to 7 except that the thickness d of the positive electrode lead was changed to 30 μm.

Examples 29 to 36

Batteries were obtained similarly to Examples 1 to 7 except that the thickness of the positive electrode at the central position Pc in the longitudinal direction was changed to 130 μm, $D1_{min}$ of the positive electrode was changed to 122.0 to 129.0 μm, $D1_{max}$ was changed to 130 μm, and the number of windings of the positive electrode was changed to 11.

Examples 37 to 46

Batteries were obtained similarly to Examples 1 to 7 except that the thickness of the positive electrode at the central position Pc in the longitudinal direction was changed to 150 μm, $D1_{min}$ of the positive electrode was changed to 140.0 to 149.0 μm, $D1_{max}$ was changed to 150 μm, and the number of turns of the positive electrode was changed to 9.

Examples 47 to 53

Batteries were obtained similarly to Examples 1 to 7 except that a blade with the distal end shape illustrated in FIG. 9 was used as the blade of the coating head, and coating of the positive electrode mixture slurry was adjusted so that the positive electrode finally obtained has a $D2_{min}$ in the range of 93.0 to 99.0 μm and a $D2_{max}$ in the range of 101.0 to 107.0 μm.

Example 54 to 60

Batteries were obtained similarly to Examples 47 to 53 except that the length L1 of the connecting portion of the positive electrode lead connected to the positive electrode current collector was changed to 60 mm.

Example 61 to 67

Batteries were obtained similarly to Examples 47 to 53 except that the length L1 of the connecting portion of the positive electrode lead connected to the positive electrode current collector was changed to 30 mm.

Comparative Example 1

A battery was obtained similarly to Example 1 except that a blade having the distal end shape illustrated in FIG. 6A was used as the blade of the coating head, $D1_{min}$ of the positive electrode was changed to 100.0 μm, and $D1_{max}$ was changed to 100 μm.

Life performances of the batteries obtained as described above were evaluated as follows.

First, the battery was charged and discharged for one cycle in a room temperature environment (23° C.). When charging, the battery was charged with a current of 1 C until the voltage reaches 4.4 V, and then charged with a voltage of 4.4 V until the current reaches 0.05 C. When discharging, the battery was discharged with a current of 1 C until the voltage reaches 3.0 V. Note that "1 C" is a current value at which a battery capacity (theoretical capacity) can be fully discharged in one hour, and "0.05 C" is a current value at which a battery capacity can be fully discharged in 20 hours. Next, a capacity retention rate (%) after 500 cycles of 0.7 C charge/0.7 C discharge in a 25° C. environment was measured. Note that the capacity retention rate means the ratio of a discharge capacity at one cycle and a discharge capacity at 500 cycles.

Tables 1 to 3 illustrate the configurations and evaluation results of the batteries of Examples 1 to 67 and Comparative Example 1.

TABLE 1

| | Width of aluminum foil (mm) | Cross-sectional shape | L1 (mm) | d (μm) | N (Turns) | DC (μm) | $D1_{min}$ (μm) | $D1_{max}$ (μm) | $(D1_{min} \times N) + d$ (μm) | $D1_{max} \times N$ (μm) | X1 | Retention rate at 500 cycles (%) |
|---|---|---|---|---|---|---|---|---|---|---|---|---|
| Comparative example 1 | 100 | Rectangular shape | 30 | 100 | 13 | 100 | 100.0 | 100.0 | 1400 | 1300 | 1.000 | 70 |
| Example 1 | 100 | FIG. 4 | 30 | 100 | 13 | 100 | 93.0 | 100.0 | 1309 | 1300 | 0.090 | 73 |
| Example 2 | 100 | FIG. 4 | 30 | 100 | 13 | 100 | 94.0 | 100.0 | 1322 | 1300 | 0.220 | 82 |
| Example 3 | 100 | FIG. 4 | 30 | 100 | 13 | 100 | 95.0 | 100.0 | 1335 | 1300 | 0.350 | 80 |
| Example 4 | 100 | FIG. 4 | 30 | 100 | 13 | 100 | 96.0 | 100.0 | 1348 | 1300 | 0.480 | 85 |
| Example 5 | 100 | FIG. 4 | 30 | 100 | 13 | 100 | 97.0 | 100.0 | 1361 | 1300 | 0.610 | 84 |
| Example 6 | 100 | FIG. 4 | 30 | 100 | 13 | 100 | 98.0 | 100.0 | 1374 | 1300 | 0.740 | 83 |
| Example 7 | 100 | FIG. 4 | 30 | 100 | 13 | 100 | 99.0 | 100.0 | 1387 | 1300 | 0.870 | 83 |
| Example 8 | 100 | FIG. 4 | 60 | 100 | 13 | 100 | 93.0 | 100.0 | 1309 | 1300 | 0.090 | 73 |
| Example 9 | 100 | FIG. 4 | 60 | 100 | 13 | 100 | 94.0 | 100.0 | 1322 | 1300 | 0.220 | 85 |
| Example 10 | 100 | FIG. 4 | 60 | 100 | 13 | 100 | 95.0 | 100.0 | 1335 | 1300 | 0.350 | 81 |
| Example 11 | 100 | FIG. 4 | 60 | 100 | 13 | 100 | 96.0 | 100.0 | 1348 | 1300 | 0.480 | 85 |
| Example 12 | 100 | FIG. 4 | 60 | 100 | 13 | 100 | 97.0 | 100.0 | 1361 | 1300 | 0.610 | 85 |
| Example 13 | 100 | FIG. 4 | 60 | 100 | 13 | 100 | 98.0 | 100.0 | 1374 | 1300 | 0.740 | 85 |
| Example 14 | 100 | FIG. 4 | 60 | 100 | 13 | 100 | 99.0 | 100.0 | 1387 | 1300 | 0.870 | 83 |
| Example 15 | 100 | FIG. 4 | 30 | 60 | 13 | 100 | 93.0 | 100.0 | 1269 | 1300 | −0.517 | 73 |
| Example 16 | 100 | FIG. 4 | 30 | 60 | 13 | 100 | 94.0 | 100.0 | 1282 | 1300 | −0.300 | 72 |
| Example 17 | 100 | FIG. 4 | 30 | 60 | 13 | 100 | 95.0 | 100.0 | 1295 | 1300 | −0.083 | 73 |
| Example 18 | 100 | FIG. 4 | 30 | 60 | 13 | 100 | 96.0 | 100.0 | 1308 | 1300 | 0.133 | 85 |
| Example 19 | 100 | FIG. 4 | 30 | 60 | 13 | 100 | 97.0 | 100.0 | 1321 | 1300 | 0.350 | 85 |
| Example 20 | 100 | FIG. 4 | 30 | 60 | 13 | 100 | 98.0 | 100.0 | 1334 | 1300 | 0.567 | 85 |
| Example 21 | 100 | FIG. 4 | 30 | 60 | 13 | 100 | 99.0 | 100.0 | 1347 | 1300 | 0.783 | 83 |

TABLE 2

| | Width of aluminum foil (mm) | Cross-sectional shape | L1 (mm) | d (μm) | N (Turns) | DC (μm) | $D1_{min}$ (μm) | $D1_{max}$ (μm) | $(D1_{min} \times N) + d$ (μm) | $D1_{max} \times N$ (μm) | X1 | Retention rate at 500 cycles (%) |
|---|---|---|---|---|---|---|---|---|---|---|---|---|
| Example 22 | 100 | FIG. 4 | 30 | 30 | 13 | 100 | 93.0 | 100.0 | 1239 | 1300 | −2.033 | 73 |
| Example 23 | 100 | FIG. 4 | 30 | 30 | 13 | 100 | 94.0 | 100.0 | 1252 | 1300 | −1.600 | 75 |
| Example 24 | 100 | FIG. 4 | 30 | 30 | 13 | 100 | 95.0 | 100.0 | 1265 | 1300 | −1.167 | 73 |
| Example 25 | 100 | FIG. 4 | 30 | 30 | 13 | 100 | 96.0 | 100.0 | 1278 | 1300 | −0.733 | 75 |
| Example 26 | 100 | FIG. 4 | 30 | 30 | 13 | 100 | 97.0 | 100.0 | 1291 | 1300 | −0.300 | 74 |
| Example 27 | 100 | FIG. 4 | 30 | 30 | 13 | 100 | 98.0 | 100.0 | 1304 | 1300 | 0.133 | 85 |
| Example 28 | 100 | FIG. 4 | 30 | 30 | 13 | 100 | 99.0 | 100.0 | 1317 | 1300 | 0.567 | 83 |
| Example 29 | 100 | FIG. 4 | 30 | 100 | 11 | 130 | 122.0 | 130.0 | 1442 | 1430 | 0.120 | 73 |
| Example 30 | 100 | FIG. 4 | 30 | 100 | 11 | 130 | 123.0 | 130.0 | 1453 | 1430 | 0.230 | 83 |
| Example 31 | 100 | FIG. 4 | 30 | 100 | 11 | 130 | 124.0 | 130.0 | 1464 | 1430 | 0.340 | 82 |
| Example 32 | 100 | FIG. 4 | 30 | 100 | 11 | 130 | 125.0 | 130.0 | 1475 | 1430 | 0.450 | 82 |
| Example 33 | 100 | FIG. 4 | 30 | 100 | 11 | 130 | 126.0 | 130.0 | 1486 | 1430 | 0.560 | 82 |
| Example 34 | 100 | FIG. 4 | 30 | 100 | 11 | 130 | 127.0 | 130.0 | 1497 | 1430 | 0.670 | 83 |
| Example 35 | 100 | FIG. 4 | 30 | 100 | 11 | 130 | 128.0 | 130.0 | 1508 | 1430 | 0.780 | 83 |
| Example 36 | 100 | FIG. 4 | 30 | 100 | 11 | 130 | 129.0 | 130.0 | 1519 | 1430 | 0.890 | 83 |
| Example 37 | 100 | FIG. 4 | 30 | 100 | 9 | 150 | 140.0 | 150.0 | 1360 | 1350 | 0.100 | 73 |
| Example 38 | 100 | FIG. 4 | 30 | 100 | 9 | 150 | 141.0 | 150.0 | 1369 | 1350 | 0.190 | 80 |
| Example 39 | 100 | FIG. 4 | 30 | 100 | 9 | 150 | 142.0 | 150.0 | 1378 | 1350 | 0.280 | 80 |
| Example 40 | 100 | FIG. 4 | 30 | 100 | 9 | 150 | 143.0 | 150.0 | 1387 | 1350 | 0.370 | 81 |
| Example 41 | 100 | FIG. 4 | 30 | 100 | 9 | 150 | 144.0 | 150.0 | 1396 | 1350 | 0.460 | 81 |
| Example 42 | 100 | FIG. 4 | 30 | 100 | 9 | 150 | 145.0 | 150.0 | 1405 | 1350 | 0.550 | 82 |
| Example 43 | 100 | FIG. 4 | 30 | 100 | 9 | 150 | 146.0 | 150.0 | 1414 | 1350 | 0.640 | 82 |
| Example 44 | 100 | FIG. 4 | 30 | 100 | 9 | 150 | 147.0 | 150.0 | 1423 | 1350 | 0.730 | 81 |
| Example 45 | 100 | FIG. 4 | 30 | 100 | 9 | 150 | 148.0 | 150.0 | 1432 | 1350 | 0.820 | 82 |
| Example 46 | 100 | FIG. 4 | 30 | 100 | 9 | 150 | 149.0 | 150.0 | 1441 | 1350 | 0.910 | 81 |

TABLE 3

|  | Width of aluminum foil (mm) | Cross-sectional shape | L1 (mm) | d (μm) | N (Turns) | DC (μm) | $D2_{min}$ (μm) | $D2_{max}$ (μm) | $(D2_{min} \times N) + d$ (μm) | $D2_{max} \times N$ (μm) | X2 | Retention rate at 500 cycles (%) |
|---|---|---|---|---|---|---|---|---|---|---|---|---|
| Example 47 | 100 | FIG. 8 | 30 | 100 | 13 | 100 | 93.0 | 107.0 | 1309 | 1391 | −0.820 | 73 |
| Example 48 | 100 | FIG. 8 | 30 | 100 | 13 | 100 | 94.0 | 106.0 | 1322 | 1378 | −0.560 | 81 |
| Example 49 | 100 | FIG. 8 | 30 | 100 | 13 | 100 | 95.0 | 105.0 | 1335 | 1365 | −0.300 | 83 |
| Example 50 | 100 | FIG. 8 | 30 | 100 | 13 | 100 | 96.0 | 104.0 | 1348 | 1352 | −0.040 | 84 |
| Example 51 | 100 | FIG. 8 | 30 | 100 | 13 | 100 | 97.0 | 103.0 | 1361 | 1339 | 0.220 | 85 |
| Example 52 | 100 | FIG. 8 | 30 | 100 | 13 | 100 | 98.0 | 102.0 | 1374 | 1326 | 0.480 | 85 |
| Example 53 | 100 | FIG. 8 | 30 | 100 | 13 | 100 | 99.0 | 101.0 | 1387 | 1313 | 0.740 | 83 |
| Example 54 | 100 | FIG. 8 | 30 | 60 | 13 | 100 | 93.0 | 107.0 | 1269 | 1391 | −2.033 | 72 |
| Example 55 | 100 | FIG. 8 | 30 | 60 | 13 | 100 | 94.0 | 106.0 | 1282 | 1378 | −1.600 | 72 |
| Example 56 | 100 | FIG. 8 | 30 | 60 | 13 | 100 | 95.0 | 105.0 | 1295 | 1365 | −1.167 | 73 |
| Example 57 | 100 | FIG. 8 | 30 | 60 | 13 | 100 | 96.0 | 104.0 | 1308 | 1352 | −0.733 | 82 |
| Example 58 | 100 | FIG. 8 | 30 | 60 | 13 | 100 | 97.0 | 103.0 | 1321 | 1339 | −0.300 | 83 |
| Example 59 | 100 | FIG. 8 | 30 | 60 | 13 | 100 | 98.0 | 102.0 | 1334 | 1326 | 0.133 | 83 |
| Example 60 | 100 | FIG. 8 | 30 | 60 | 13 | 100 | 99.0 | 101.0 | 1347 | 1313 | 0.567 | 84 |
| Example 61 | 100 | FIG. 8 | 30 | 30 | 13 | 100 | 93.0 | 107.0 | 1239 | 1391 | −5.067 | 73 |
| Example 62 | 100 | FIG. 8 | 30 | 30 | 13 | 100 | 94.0 | 106.0 | 1252 | 1378 | −4.200 | 74 |
| Example 63 | 100 | FIG. 8 | 30 | 30 | 13 | 100 | 95.0 | 105.0 | 1265 | 1365 | −3.333 | 75 |
| Example 64 | 100 | FIG. 8 | 30 | 30 | 13 | 100 | 96.0 | 104.0 | 1278 | 1352 | −2.467 | 74 |
| Example 65 | 100 | FIG. 8 | 30 | 30 | 13 | 100 | 97.0 | 103.0 | 1291 | 1339 | −1.600 | 73 |
| Example 66 | 100 | FIG. 8 | 30 | 30 | 13 | 100 | 98.0 | 102.0 | 1304 | 1326 | −0.733 | 75 |
| Example 67 | 100 | FIG. 8 | 30 | 30 | 13 | 100 | 99.0 | 101.0 | 1317 | 1313 | 0.133 | 83 |

The meaning of each signs described in Tables 1 to 3 is as follows.

L1: length of connecting portion of positive electrode lead (welded portion) (μm)

d: thickness of positive electrode lead (μm)

N: number of windings (turns)

Dc: thickness of positive electrode at central position Pc in width direction of positive electrode (see FIGS. 4 and 8)

$D1_{min}$: minimum thickness (μm) of inclined portion (thin portion) (see FIG. 4)

$D1_{max}$: maximum thickness (μm) of inclined portion (thin portion) (see FIG. 4)

$D2_{min}$: minimum thickness (μm) of positive electrode whose entire surface is inclined (see FIG. 8)

$D2_{max}$: maximum thickness (μm) of positive electrode whose entire surface is inclined (see FIG. 8)

X1: $(((D1_{min} \times N) + d) - (D1_{max} \times N))/d$

X2: $(((D2_{min} \times N) + d) - (D2_{max} \times N))/d$

Comparing the evaluation results of Examples 1 to 67 with Comparative Example 1, it can be seen that the capacity retention rate of a battery in which the cross-sectional shape of the positive electrode active material layer along the width direction is the shape illustrated in FIG. 4 or 8 is large as compared to the capacity retention rate of a battery in which the cross-sectional shape of the positive electrode active material layer along the width direction is rectangular.

Comparing the evaluation results of Examples 1 to 46, among the batteries in which the cross-sectional shape of the positive electrode active material layer along the width direction is the shape illustrated in FIG. 4, it can be seen that the capacity retention rate is particularly improved in the battery in which X1 is in the range of 0.13<X1<1.

Comparing the evaluation results of Examples 47 to 67, among the batteries in which the cross-sectional shape of the positive electrode active material layer along the width direction is the shape illustrated in FIG. 8, it can be seen that the capacity retention rate is particularly improved in the battery in which X2 is in the range of −0.3≤X2<1.

Although the embodiments and examples of the present disclosure have been specifically described above, the present disclosure is not limited to the above-described embodiment and examples, and various modifications based on the technical idea of the present disclosure are possible.

For example, the configurations, methods, processes, shapes, materials, numerical values, and the like given in the above-described embodiment, modification examples, and examples thereof are merely examples, and different configurations, methods, steps, shapes, materials, and numerical values may be used. In addition, chemical formulas of compounds and the like are representative and are not limited to the described valences and the like as long as they are of general names of the same compounds.

In addition, the configurations, methods, processes, shapes, materials, numerical values, and the like of the above-described embodiment, modification examples, and examples thereof can be combined with each other without departing from the gist of the present disclosure.

Further, the present disclosure is described below in further detail according to an embodiment.

(1)

A battery including:

a positive electrode having a strip shape and having a positive electrode lead; and a negative electrode having a strip shape and having a negative electrode lead, in which the positive electrode and the negative electrode are wound so that first ends in a longitudinal direction of the positive electrode and the negative electrode are on an inner peripheral side, and second ends in the longitudinal direction of the positive electrode and the negative electrode are on an outer peripheral side, the positive electrode lead and the negative electrode lead are extended out from a first end side in a width direction of the positive electrode and the negative electrode, and a thickness of the positive electrode on the first end side in the width direction is thinner than a thickness of the positive electrode on a second end side in the width direction.

(2)

The battery according to (1), in which at least one of the positive electrode lead or the negative electrode lead is provided on a first end side in the longitudinal direction.

(3)

The battery according to (1) or (2), in which
the positive electrode includes a positive electrode current collector and a positive electrode active material layer provided on the positive electrode current collector, and
the positive electrode active material layer has a thin portion on the first end side in the width direction that is thinner than a thickness on the second end side in the width direction.

(4)

The battery according to (3), in which the thin portion has a thickness that decreases in a direction from a second end to a first end in the width direction.

(5)

The battery according to (4), in which the thin portion has an inclined surface or a stepped surface.

(6)

The battery according to (4) or (5), in which the positive electrode satisfies a following relational expression (1).

$$0.13 < X1 < 1 \quad (1)$$

(Here, $X1=(((D1_{min} \times N)+d)-(D1_{max} \times N))/d$, $D1_{min}$ is a minimum thickness of the positive electrode in the thin portion, $D1_{max}$ is a maximum thickness of the positive electrode in the thin portion, N is a number of windings of the positive electrode, and d is a thickness of the positive electrode lead)

(7)

The battery according to any one of (3) to (6), in which
the positive electrode lead is connected to the positive electrode,
the negative electrode lead is connected to the negative electrode, and
the thin portion is wound on a connecting portion of the positive electrode lead and on a connecting portion of the negative electrode lead.

(8)

The battery according to any one of (3) to (7), in which the thin portion is provided from a first end to a second end in a longitudinal direction of the positive electrode active material layer.

(9)

The battery according to (1), in which
the positive electrode includes a positive electrode current collector and a positive electrode active material layer provided on the positive electrode current collector, and
the positive electrode active material layer has a thickness that decreases in a direction from a second end to a first end in the width direction.

(10)

The battery according to (9), in which the positive electrode satisfies a following relational expression (2).

$$-0.3 \leq X2 < 1 \quad (2)$$

(Here, $X2=(((D2_{min} \times N)+d)-(D2_{max} \times N))/d$, $D2_{min}$ is a minimum thickness of the positive electrode, $D2_{max}$ is a maximum thickness of the positive electrode, N is a number of windings of the positive electrode, and d is a thickness of the positive electrode lead)

(11)

The battery according to any one of (1) to (10), in which
the positive electrode includes a positive electrode current collector and a positive electrode active material layer provided on the positive electrode current collector, and has a positive electrode current collector exposing portion where the positive electrode current collector is exposed, the negative electrode includes a negative electrode current collector and a negative electrode active material layer provided on the negative electrode current collector, and has a negative electrode current collector exposing portion where the negative electrode current collector is exposed, and
the positive electrode lead and the negative electrode lead are connected to the positive electrode current collector exposing portion and the negative electrode current collector exposing portion, respectively.

(12)

The battery according to any one of (1) to (11), in which the winding is a flat winding.

(13)

The battery according to any one of (1) to (12), further including an exterior member that accommodates the positive electrode and the negative electrode.

(14)

The battery according to (13), in which the exterior member is a laminated film.

(15)

A battery pack including:
the battery according to any one of (1) to (14); and
a control unit that controls the battery.

(16)

An electronic device including the battery according to any one of (1) to (14), in which the electronic device receives power from the battery.

(17)

An electric vehicle including:
the battery according to any one of (1) to (14);
a converter that receives supply of power from the battery and converts the power into a driving force of the vehicle; and
a control device that performs information processing on vehicle control based on information on the battery.

(18)

A power storage device including the battery according to any one of (1) to (14), in which the power storage device supplies power to an electronic device connected to the battery.

(19)

A power system including the battery according to any one of (1) to (14), in which the power system receives supply of power from the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising:
a positive electrode having a first strip shape and a positive electrode lead; and
a negative electrode having a second strip shape and a negative electrode lead,
wherein
the positive electrode and the negative electrode are wound so that first ends in a longitudinal direction of the positive electrode and the negative electrode are on an inner peripheral side, and second ends in the longitudinal direction of the positive electrode and the negative electrode are on an outer peripheral side, the positive electrode lead and the negative electrode lead are extended out from a first end side in a width direction of the positive electrode and the negative electrode, and a first thickness of the positive electrode on the first end side in the width direction is thinner than a second thickness of the positive electrode on a second end side in the width direction, wherein the positive electrode includes a positive electrode current collector and a positive electrode active material layer provided on the positive electrode current collector, wherein the positive active material layer has a flat portion provided on the second end side in the width direction of the positive electrode and parallel to a surface of the positive electrode current collector, wherein the positive electrode active material layer has an inclined portion provided on the first end side in the width direction of the positive electrode, wherein the inclined portion is thinner than the flat portion, and wherein the positive electrode lead is wound by the inclined portion of the positive electrode active material layer and overlaps with the inclined portion of the positive active material layer.

2. The battery according to claim 1, wherein at least one of the positive electrode lead or the negative electrode lead is provided on the first end in the longitudinal direction.

3. The battery according to claim 1, wherein the inclined portion has a thickness that decreases in a direction from the second end side to the first end side in the width direction.

4. The battery according to claim 3, wherein the inclined portion has an inclined surface or a stepped surface.

5. The battery according to claim 3, wherein the positive electrode satisfies a relational expression (1):

$$0.13 < X1 < 1 \tag{1}$$

wherein $X1 = (((D1_{min} \times N) + d) - (D1_{max} \times N))/d$, and wherein $D1_{max}$ represents a minimum thickness of the positive electrode in the inclined portion, $D1_{max}$ represents a maximum thickness of the positive electrode in the inclined portion, N represents a number of windings of the positive electrode, and d represents a thickness of the positive electrode lead.

6. The battery according to claim 1, wherein
the positive electrode lead is connected to the positive electrode,
the negative electrode lead is connected to the negative electrode, and
the inclined portion is wound on a connecting portion of the positive electrode lead and on a connecting portion of the negative electrode lead.

7. The battery according to claim 1, wherein the inclined portion is provided from a first end to a second end in a longitudinal direction of the positive electrode active material layer.

8. The battery according to claim 1, wherein
the positive electrode active material layer has a thickness that decreases in a direction from a second end side to a first end side in the width direction.

9. The battery according to claim 8, wherein the positive electrode satisfies a relational expression (2):

$$-0.3 \leq X2 < 1 \tag{2}$$

wherein $X2 = (((D2_{min} + d) - (D2_{max} \times N))/d$, and wherein $D2_{min}$ represents a minimum thickness of the positive electrode, $D2_{max}$ represents a maximum thickness of the positive electrode, N represents a number of windings of the positive electrode, and d represents a thickness of the positive electrode lead.

10. The battery according to claim 1, wherein
the positive electrode has a positive electrode current collector exposing portion where the positive electrode current collector is exposed,
the negative electrode includes a negative electrode current collector and a negative electrode active material layer provided on the negative electrode current collector, and has a negative electrode current collector exposing portion where the negative electrode current collector is exposed, and
the positive electrode lead and the negative electrode lead are connected to the positive electrode current collector exposing portion and the negative electrode current collector exposing portion, respectively.

11. The battery according to claim 1, wherein the winding is a flat winding.

12. The battery according to claim 1, further comprising an exterior member configured to accommodate the positive electrode and the negative electrode.

13. The battery according to claim 12, wherein the exterior member includes a laminated film.

14. A battery pack comprising:
the battery according to claim 1; and
a controller configured to control the battery.

15. An electronic device comprising the battery according to claim 1,
wherein the electronic device is configured to receive supply of power from the battery.

16. An electric vehicle comprising:
the battery according to claim 1;
a converter configured to receive supply of power from the battery and convert the power into a driving force of the vehicle; and
a controller configured to perform information processing on vehicle control based on information on the battery.

17. A power storage device comprising the battery according to claim 1, wherein
the power storage device is configured to supply power to an electronic device connected to the battery.

18. A power system comprising the battery according to claim 1, wherein
the power system is configured to receive supply of power from the battery.

* * * * *